(12) United States Patent
Serbest et al.

(10) Patent No.: US 6,343,065 B1
(45) Date of Patent: Jan. 29, 2002

(54) SYSTEM AND METHOD OF MEASUREMENT-BASED ADAPTIVE CACHING OF VIRTUAL CONNECTIONS

(75) Inventors: Yetik Serbest; Haifeng Bi; Samuel Sigarto, all of Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

(21) Appl. No.: 09/487,869

(22) Filed: Jan. 20, 2000

(51) Int. Cl.[7] .............................. H04J 3/14; H04L 12/66
(52) U.S. Cl. ...................... 370/230; 370/252; 370/356; 370/395; 370/401
(58) Field of Search ................................ 370/229, 230, 370/231, 232, 233, 234, 235, 236, 352, 395, 410, 252, 253, 356, 401, 522, 524, 397; 379/220, 224

(56) References Cited

U.S. PATENT DOCUMENTS

| | | | |
|---|---|---|---|
| 5,483,527 A | 1/1996 | Doshi et al. | 370/399 |
| 5,719,863 A | 2/1998 | Hummel | 370/392 |
| 5,914,956 A | 6/1999 | Williams | 370/395 |
| 5,943,321 A | 8/1999 | St-Hilaire et al. | 370/259 |
| 5,953,316 A | 9/1999 | Lazar et al. | 370/230 |
| 6,151,315 A * | 11/2000 | Ash et al. | 370/352 |
| 6,169,735 B1 | 1/2001 | Allen, Jr. et al. | 370/352 |
| 6,195,333 B1 * | 2/2001 | Wise | 370/235 |
| 6,195,714 B1 | 2/2001 | Li et al. | 370/352 |
| 6,219,348 B1 * | 4/2001 | Allen, Jr. et al. | 370/354 |
| 6,275,493 B1 * | 8/2001 | Morris et al. | 370/395 |
| 6,282,194 B1 * | 8/2001 | Cheesman et al. | 370/356 |

* cited by examiner

Primary Examiner—Melvin Marcelo
Assistant Examiner—Soon-Dong Hyun
(74) Attorney, Agent, or Firm—Greenblum & Bernstein, P.L.C.

(57) ABSTRACT

An adaptive SVC caching method and system are provided to offload the high processing capacity burden of ATM switches. After an SVC is established in a usual way for a call, it is not torn down after the conversation ends. Instead, the SVC is kept alive for a variable duration (i.e., delayed release) with the expectation that there will be another call request for the same terminating end office during that time. The caching duration is adaptively changed with call arrival rate and call setup delay in the ATM network in order to stay within a delay budget specified by the requirements.

21 Claims, 17 Drawing Sheets

SYSTEM AND METHOD OF MEASUREMENT-BASED ADAPTIVE CACHING OF VIRTUAL CONNECTIONS

BACKGROUND OF THE INVENTION

1. Field of the Invention

The present invention relates to the field of telecommunications. More particularly, the present invention relates to improving performance in switch based telecommunications networks employing virtual connections, such as switched virtual connections (SVCs). The telecommunications network may include virtual tandem switches employing asynchronous transfer mode (ATM) networks.

2. Background Information

In standard call processing, cross-office delay must be below an acceptable level in order to minimize the duration of silence after a telephone call has been dialed. The signaling channel message processing required for standard call processing is well-studied and well-specified for conventional time division multiplexed (TDM) circuit-switched voice networks. ITU-T, "Specifications of Signaling System No. 7 ISDN User Part", ITU-T Recommendation Q.766, March, 1993; and Bellcore, "LSSGR: Switch Processing Time Generic Requirements, Section 5.6", GR-1364-CORE, Issue 1, June, 1995, are specifications discussing such processing. These specifications dictate the cross-office delay requirements for processing of a Signaling System No.7 (SS7) messages.

With reference to FIG. 1 of the drawings, standard call processing employs end offices 10 connected via tandem trunks 12, direct trunks 14, or both tandem 12 and direct trunks 14. Each trunk 12, 14 is a digital service level 0 (DS0), operating at 64 kbps, that is transmitted between the switching offices 10 in a time division multiplexed manner. Each end office 10 connects to its neighboring end office 10 and the tandem office 16 using separate trunk groups. In this system, trunk groups are forecasted and pre-provisioned with dedicated bandwidth, which may lead to inefficiency and high operations cost.

A new voice trunking system using asynchronous transfer mode (ATM) technology has been proposed in U.S. patent application Ser. No. 09/287,092, entitled "ATM-Based Distributed Virtual Tandem Switching System," filed on Apr. 7, 1999, the disclosure of which is expressly incorporated herein by reference in its entirety. In this system, shown in FIG. 2, voice trunks from end office switches 20, 26 are converted to ATM cells by a trunk inter-working function (T-IWF) device 22, 24. The T-IWFs 22, 24 are distributed to each end office 20, 26, and are controlled by a centralized control and signaling inter-working function (CS-IWF) device 28. The CS-IWF 28 performs call control functions as well as conversion between the narrowband Signaling System No. 7 (SS7) protocol and a broadband signaling protocol. The T-IWFs 22, 24, CS-IWF 28, and the ATM network 30 form the ATM-based distributed virtual tandem switching system. According to this voice trunking over ATM (VTOA) architecture, trunks are no longer statistically provisioned DS0 time slots. Instead, the trunks are realized through dynamically established switched virtual connection (SVCs), thus eliminating the need to provision separate trunk groups to different destinations, as done in TDM-based trunking networks.

The actions necessary in each office are clearly defined upon reception of a particular SS7 message when operating within the standard network. For a normal tandem trunk call flow, the originating end office sends an Initial Address Message (IAM) to the tandem switch through an SS7 network. The IAM message includes a routing address of the tandem office, calling telephone number, called telephone number, and Trunk ID. The tandem switch has a mean processing delay budget of 180 ms as specified in "Specifications of Signaling System No. 7 ISDN User part" (360 ms for 95th percentile) to process the IAM message and to reserve a trunk in the trunk group that is pre-established to the terminating end office.

In voice trunking over ATM (VTOA) technology, a standard time division multiplexed (TDM) tandem is replaced by three components: a trunk inter-working function (T-IWF), a control and signaling inter-working function (CS-IWF), and an ATM network. The three component architecture (i.e., T-IWFs, CS-IWF, and ATM network) requires signaling channel message processing different from IDM processing but must maintain at least the performance of standard TDM-based network processing. That is, these three components should share the 180 ms (mean) budget, as they are considered to be a unique entity, i.e., a virtual tandem switching system. Hence, the time for the ATM network to establish a switched virtual connection (SVC), which is VTOA's equivalent to reserving a trunk, is stringent.

In VTOA architecture, the end offices and the virtual tandem (i.e., CS-IWF) communicate through an SS7 network, as seen in FIG. 2, the same way the switching offices communicate in TDM-based trunking networks. However, control/signaling and through-connect establishment (an SVC through the ATM network) functions reside in the CS-IWF, and the ATM network and T-IWF, respectively. Coordinating the different components adds new message exchanges into the processing.

In the VTOA architecture, the CS-IWFs have two options upon receiving an IAM message. The first option is to send a message to either an originating or terminating T-IWF for initiation of an ATM connection and wait for an "ATM SVC Established" message before sending the IAM message to the terminating end office. The second option is to send the IAM message to the terminating end office at the same time it sends a request to either T-IWF for an ATM connection establishment. It is expected that the ATM connection will be ready before the reception of Address Complete Message (ACM), which indicates that ringing is applied to the callee and the through-connect should be established in the tandem. The second option provides more time for the establishment of an SVC through ATM network. However, an SVC may very well go through several ATM switches, which generally have reasonably large figures for call setup latency. Although some exceptions exist, it would be unreasonable to assume the latency is low because the latency numbers of new switches are yet to be tested, and already deployed ATM switches can be assumed to serve years to come. In other words, for either option there exists a need for fast SVC setup through the ATM network to stay within the standardized delay budget limits.

One solution to the latency problem is to construct an overlay PVP (Permanent Virtual Path) network in the ATM backbone. With a PVP network, only end points of virtual paths require call processing and transit nodes are not involved in the establishment of SVCs. Further, the design of virtual path networks has been well studied and thus many proposed optimization algorithms exist. However, the efficient management of virtual path networks is still a challenging task in practice. Although constructing an elastic virtual path, which resizes itself with the changing traffic conditions, is a promising solution, there is currently no standard procedure for automatically changing the capacity of virtual paths. Consequently, a telecommunications carrier would have to commit to a proprietary solution, which has its own disadvantages. Finally, PVP networks suffer from the drawback of requiring manual rerouting in case of a network failure. In contrast SVCs are rerouted automatically by the Private Network—Network Interface (PNNI) routing protocol without interference from the management system in case of failures in ATM network. For management and operations purposes, this feature makes the SVCs highly appealing.

SUMMARY OF THE INVENTION

In view of the foregoing, the present invention is directed to improving the performance of VTOA systems. The present invention reduces the total number of SVCs in the ATM network, improves bandwidth utilization, and eliminates a need for manual cache management.

According to an aspect of the present invention an adaptive SVC caching system and method overcome the limitations of ATM switches discussed above by delaying release of SVCs. That is, an already established SVC is not immediately released when a conversation finishes (i.e., when either side hangs up). Instead, the SVC is kept alive for a variable duration, referred to as a caching time, with the expectation that during that time another call request for the same terminating end office will arrive. The caching duration is adaptively changed based upon a call arrival rate and call setup delay experienced in the ATM network in order to stay within the required delay budget. Thus, the processing load of the ATM network is constantly monitored and the caching time is changed accordingly. Preferably, the caching time is increased when the call setup time exceeded the budget, and is decreased when the call setup time was less than required. The present invention successfully tracks changes in the processing load of the ATM network (call setup delay) and in the call arrival rate.

According to an aspect of the present invention, an adaptive switched virtual circuit (SVC) caching method is provided for use within a telecommunications network. The method includes defining a delay budget; estimating a call arrival rate in the network; and estimating a call setup delay in the network. The method also includes determining a cache duration based upon the delay budget, the estimated call arrival rate, and the estimated call setup delay. When an SVC is cached for the cache duration, the caching facilitates processing telephone calls in the network within the delay budget by eliminating call processing for new SVC establishment when a new call request to the destination occurs during the cache.

According to a preferred embodiment, the cache duration is inversely related to the call setup delay. More preferably, the cache duration $t_{cache}$ is calculated from the equation:

$$t_{cache}(n) \approx \frac{1}{\beta\langle\lambda\rangle(n-1)}\log\left(\frac{\langle d\rangle_{setup}(n-1)}{d_{budget}}\right)$$

where:

$\langle\lambda\rangle$ is an estimate of the mean call arrival rate.

$\langle d\rangle_{setup}$ is an estimate of the mean call setup delay in an ATM network;

$d_{budget}$ is the delay budget;

$\beta$ is a predetermined constant between zero and one; and n is the time when the call arrival rate and the call setup delay are measured.

According to a preferred embodiment, estimating the call arrival rate includes periodically measuring the call arrival rate at a predetermined interval. Estimating the call setup delay in the network includes periodically measuring the call setup delay in the network at a predetermined interval.

According to an aspect of the present invention, an adaptive switched virtual circuit (SVC) caching method is provided for use within a telecommunications in the network; and estimating a call setup delay in the network. The method also includes determining a cache duration based upon the delay budget, the estimated call arrival rate, and the estimated call setup delay. The method further includes establishing an SVC to a destination in response to a telephone call to the destination; caching the SVC for the cache duration after the telephone call terminates; reusing the cached SVC when a new call request to the destination occurs during the cache; and releasing the cached SVC after the cache duration when no new call request to the destination occurs during the cache. The cached SVC facilitates processing telephone calls in the network within the delay budget by eliminating call processing for new SVC establishment when the new call request to the destination occurs during the cache.

According to a preferred embodiment, estimating the call arrival rate includes periodically measuring the call arrival rate at a predetermined interval. Estimating the call setup delay in the network includes periodically measuring the call setup delay in the network at a predetermined interval. Measuring the call setup delay may include measuring the time between transmitting an initial setup message from an originating T-IWF and receiving a final connect message at the originating T-IWF.

According to a preferred embodiment, the cache duration is inversely related to the call setup delay. More preferably, the cache duration $t_{cache}$ is calculated from the equation:

$$t_{cache}(n) \approx \frac{1}{\beta\langle\lambda\rangle(n-1)}\log\left(\frac{\langle d\rangle_{setup}(n-1)}{d_{budget}}\right)$$

where:

$\langle\lambda\rangle$ is an estimate of the mean call arrival rate.

$\langle d\rangle_{setup}$ is an estimate of the mean call setup delay in an ATM network;

$d_{budget}$ is the delay budget;

$\beta$ is a predetermined constant between zero and one; and n is the time when the call arrival rate and the call setup delay are measured.

According to a preferred embodiment, the estimate of the mean call arrival rate is filtered, and the estimate of the mean call setup delay in the ATM network is filtered. Preferably, the estimate of the mean call arrival rate is filtered according to the equation:

$$\langle\lambda\rangle(i)=(1-w)\langle\lambda\rangle(i-1)+w\langle\lambda\rangle(i)$$

and the estimate of the mean call setup delay in the ATM network is filtered according to the equation:

$$\langle d\rangle_{setup}(i)=(1-w)\langle d\rangle_{setup}(i-1)+W\langle d\rangle_{setup}(i)$$

where w is a weight, and i is a unit of time. Preferably w=0.1. Moreover, a longest cached SVC is selected for use when more than one cached SVC is available for the destination.

According to another aspect of the present invention, a telecommunications system is provided for adaptive switched virtual circuit (SVC) caching. The telecommunications system has a predefined delay budget. The system includes an ATM network having a call arrival rate and a call setup delay; and at least one SVC within the network, the SVC being established to a destination in response to a telephone call to the destination. The system also includes a plurality of T-IWFs that estimate the call arrival rate and the call setup delay. Each T-IWF determines a cache duration based upon the predefined delay budget, the estimated call arrival rate, and the estimated call setup delay. The system also includes a CS-IWF. The SVC is cached for the cache duration after the telephone call terminates. In addition, the cache, and the cached SVC is released after the cache duration when no new call request to the destination occurs during the cache. The cached SVC facilitates processing telephone calls in the ATM network within the delay budget by eliminating call processing for new SVC establishment when the new call request to the destination occurs during the cache.

According to a preferred embodiment, the cache duration is inversely related to the call setup delay. More preferably, each T-IWF calculates the cache duration $t_{cache}$ from the equation:

$$t_{cache}(n) \approx \frac{1}{\beta \langle \lambda \rangle (n-1)} \log\left(\frac{\langle d \rangle_{setup}(n-1)}{d_{budget}}\right)$$

where:

$\langle \lambda \rangle$ is an estimate of the mean call arrival rate;

$\langle d \rangle_{setup}$ is an estimate of the mean call setup delay in the ATM network;

$d_{budget}$ is the delay budget;

$\beta$ is a predetermined constant between zero and one; and n is the time when the call arrival rate and the call setup delay are measured.

According to a preferred embodiment, the estimate of the mean call arrival rate is filtered, and the estimate of the mean call setup delay in the ATM network is filtered. Preferably, the estimate of the mean call arrival rate is filtered by the equation:

$$\langle \lambda \rangle(i) = (1-w)\langle \lambda \rangle(i-1) + w \langle \lambda \rangle(i)$$

and the estimate of the mean call setup delay in the ATM network is filtered by the equation:

$$\langle d \rangle_{setup}(i) = (1-w)\langle d \rangle_{setup}(i-1) + w \langle d \rangle_{setup}(i)$$

where w is a weight, and i is a unit of time.

According to a preferred embodiment, the T-IWFs estimate the call arrival rate by periodically measuring the call arrival rate at a predetermined interval. Further, the T-IWFs estimate the call setup delay in the network by periodically measuring the call setup delay in the network at a predetermined interval. An originating T-IWF measures the call setup delay by measuring the time between transmitting an initial setup message from the originating T-IWF and receiving a final connect message at the originating T-IWF. Preferably, the T-IWF selects a longest cached SVC for reuse when more than one cached SVC is available for the destination.

BRIEF DESCRIPTION OF THE DRAWINGS

The present invention is flirter described in the detailed description that follows, by reference to the noted plurality of drawings by way of non-limiting examples of preferred embodiments of the present invention, in which like reference numerals represent similar parts throughout several views of the drawings, and in which.

DETAILED DESCRIPTION OF THE PREFERRED EMBODIMENTS

The present invention is directed to delaying release of SVCs. That is, even after a conversation ends, the established SVC is kept alive for an adaptive duration with an expectation that during that time there may be a call request for the same destination, hence, the same SVC could be recycled. The present invention reduces the cost of call processing in the ATM network by adaptively determining the caching duration. The adaptation process is discussed in detail below.

In order to determine an appropriate caching duration, the telecommunications carrier must initially decide on a delay budget for the ATM network portion of the ATM-based distributed virtual tandem switching system. This decision would most likely be a compromise with respect to processing power of the ATM switches and should correspond to the call setup latency requirement for voice networks. For a given delay budget $d_{budget}$ (i.e., the requirement for mean call processing time), the mean SVC setup latency in the ATM network should be kept below $d_{budget}$. Otherwise, the call setup latency requirement for voice networks would be violated. Thus, unwanted consequences such as an increase in impatient hang-ups and re-attempts due to escalated post-delay could occur.

Because T-IWFs at the edge of the ATM network initiate SVC setup in VTOA architecture, the SVC caching scheme is implemented in the T-IWF to enforce the $d_{budget}$ requirement. To do so, the T-IWFs track SVC setup latency in the ATM network. The T-IWFs, however, do not need to be aware of ATM topology in order to track the latency.

The processing load in the ATM network varies according to time. Thus, the T-IWF should probe the changes in the call processing load of the ATM network by deploying a measurement scheme to estimate SVC setup latency of the ATM network. Because the activity of voice traffic changes by time of the day (work or off-work hours) and by community of interest (business or residential), each T-IWF should keep a separate measurement to every other T-IWF.

Figure 1:
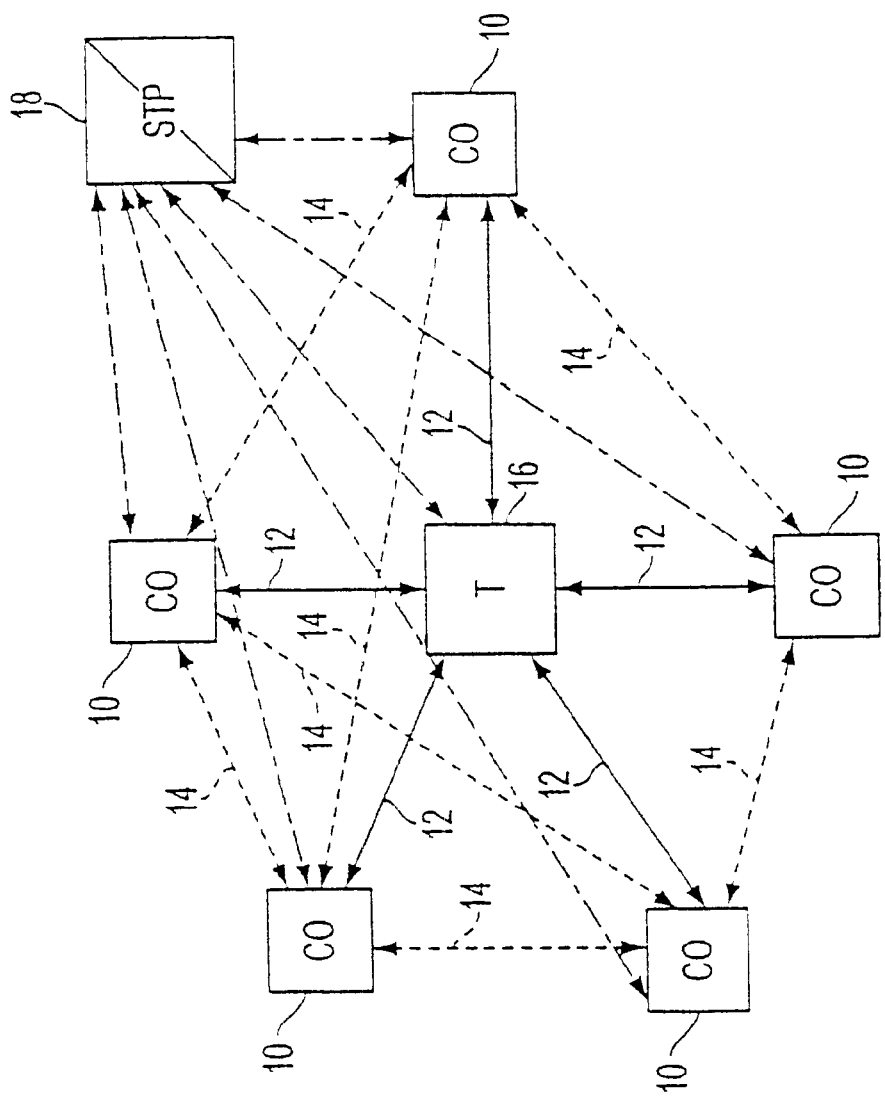
FIG. 1 shows a conventional TDM telecommunications network architecture.
Figure 2:
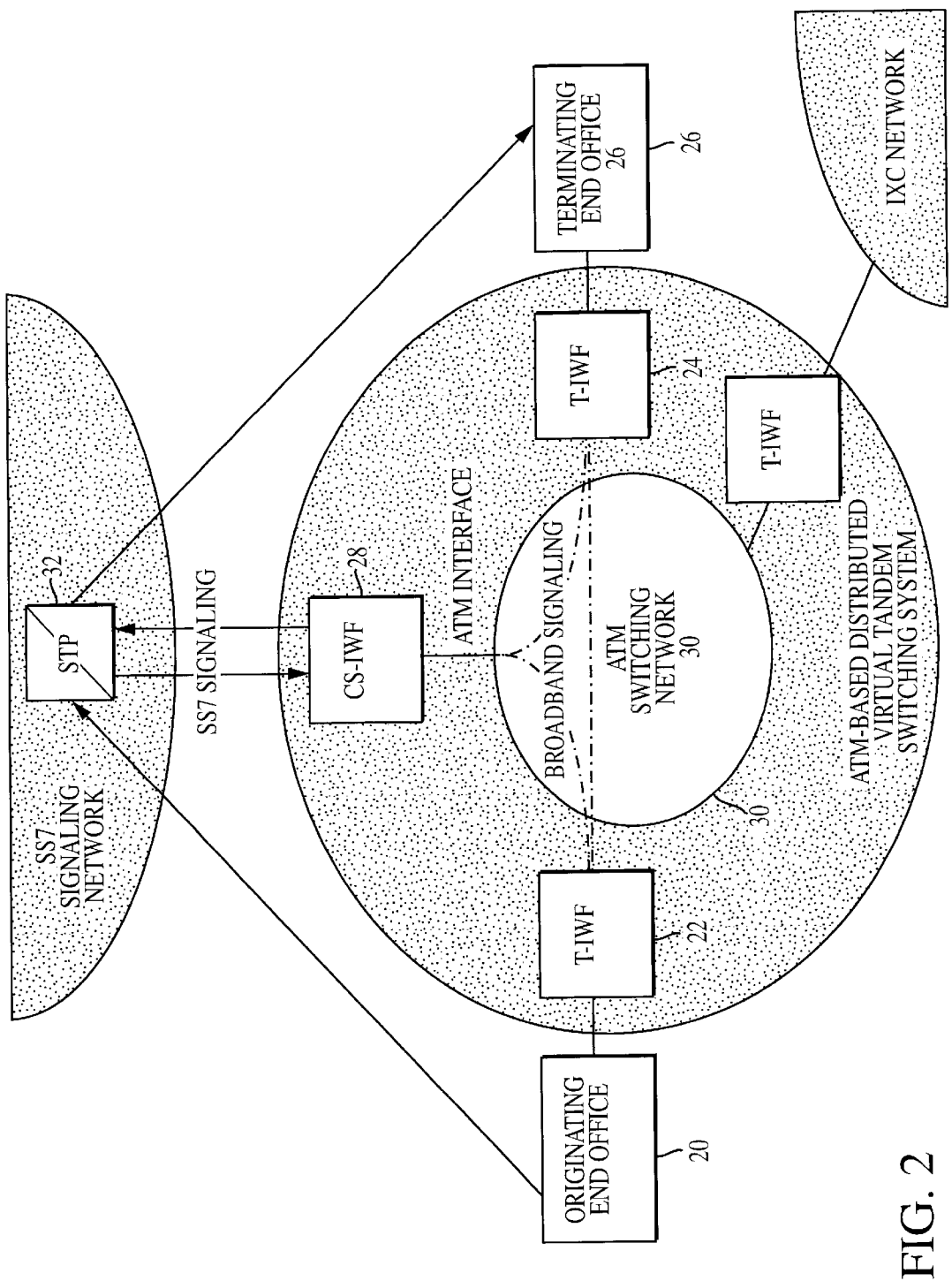
FIG. 2 shows a known virtual trunking over ATM telecommunications network architecture.
Figure 3:
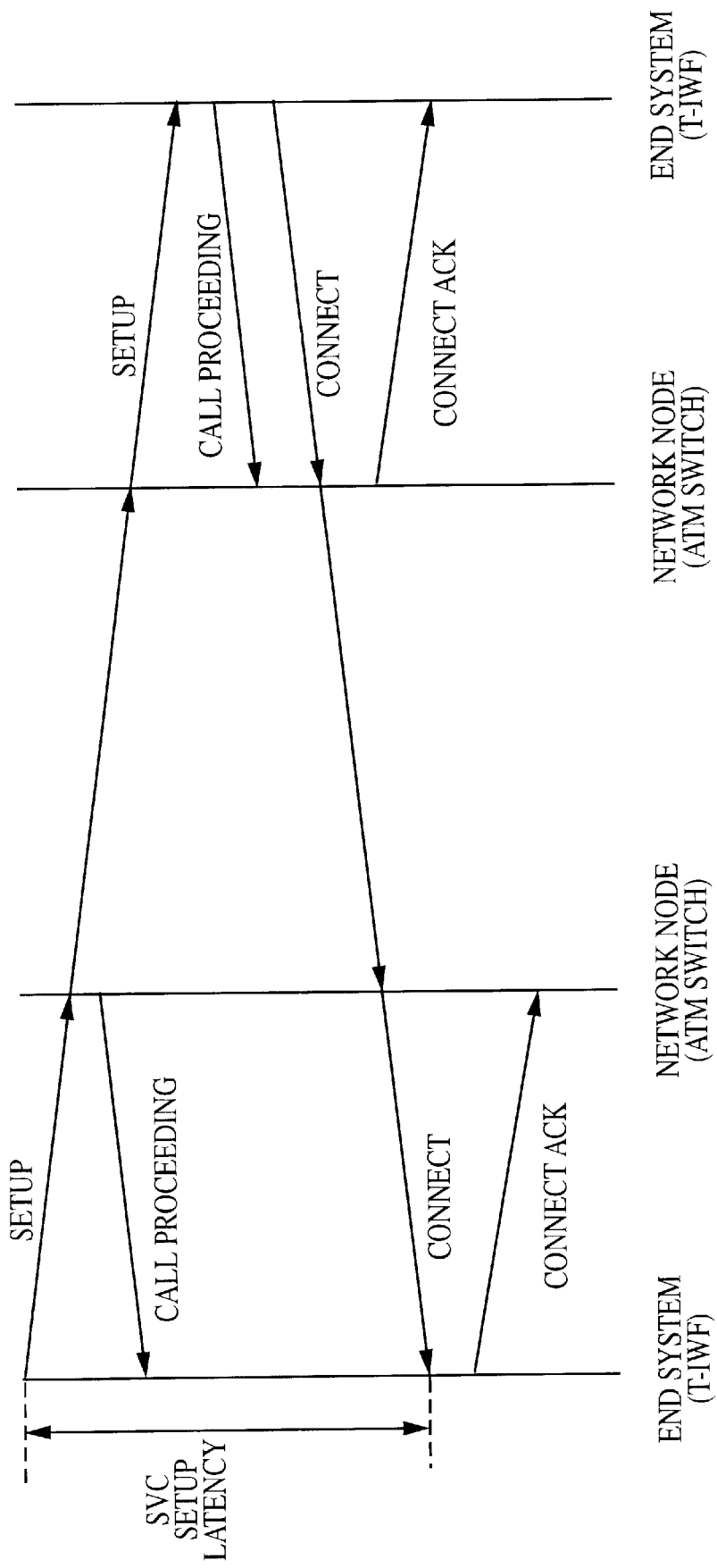
FIG. 3 shows setup connection messages for use within the VTOA telecommunications network shown in FIG. 2.

The SVC setup latency can be estimated by measuring the time elapsed between a User Network Interface (UNI) "SETUP" message sent and a "CONNECT" message received, as depicted in FIG. 3. Initially, the "SETUP" message is sent from the originating T-IWF to the associated ATM switch, which responds with a "CALL PROCEEDING" message, indicating that the "SETUP" message is being processed. After the originating T-IWF receives the "SETUP" message, that message is transmitted through the ATM network to the terminating ATM switch. The terminating ATM switch sends the "SETUP" message to the terminating T-IWF, which issues a "CALL PROCEEDING" message back to the terminating ATM switch. After the terminating T-IWF processes the "SETUP" message and allocates necessary resources (e.g., a virtual channel identifier), a "CONNECT" message is sent to the terminating ATM switch, which forwards the message on to the originating ATM switch, and ultimately to the originating T-IWF. In response to the "CONNECT" messages, "CONNECT ACK" (acknowledgment) messages are transmitted from the originating T-IWF to the ATM switch and from terminating ATM switch to the terminating T-IWF.

An inverse relationship exists between the mean SVC setup latency and the caching duration. That is, as the caching duration increases, the mean SVC setup latency decreases. In addition, as the caching duration decreases, the mean SVC setup latency increases. For instance, the longer an SVC is cached, the higher the probability that a call request is accommodated, that is, that a cached SVC is hit.

According to the present invention, the caching time $t_{cache}$ is adaptively changed with the latency experienced in the ATM network and the call arrival rate. During each measurement interval ($n^{th}$ $T_{MI}$) the caching time $t_{cache}$ is calculated as in equation (1), where $<\lambda>$ is the estimate of the mean call arrival rate and $<d>_{setup}$ is the estimate of the mean call setup delay in the ATM network.

$$t_{cache}(n) \approx \frac{1}{\beta\langle\lambda\rangle(n-1)}\log\left(\frac{\langle d\rangle_{setup}(n-1)}{d_{budget}}\right) \quad (1)$$

In equation (1), $<\lambda>$ and $<d>_{setup}$ are obtained by measurements and are filtered every $T_{MI}$, as shown in equation (2). The parameter β is a predetermined constant between zero and one, explained below.

$$<\lambda>(i)=(1-w)<\lambda>(i-1)+w<\lambda>(i) <d>_{setup}(i)=(1-W)<d>_{setup}(i-1)+w<d>_{setup}(i) \quad (2)$$

The filtering operation increases the stability of the algorithm, hence, to reduce the effect of high frequency components in the measurements. The variable i represents a moment in time. The weight w determines the time constant of the low-pass filter. The larger w is, the more responsive the algorithm is. If w is too large, the filter will not diminish the effect of transient changes in, $<\lambda>$, and $<d>_{setup}$. On the other hand, the smaller w is the more stable the algorithm is. In other words, if w is set too low, the algorithm responds too slowly to changes in the actual call arrival rate and call setup delay. In a preferred embodiment, w is equal to 0.1.

Note that the aim of the adaptive caching is to keep the mean call setup latency $d_{post\_cache}$ below the requirement $d_{setup}$ when an SVC has to be setup in the ATM network. The caching time $t_{cache}$ found from equation (1) automatically guarantees that $d_{post\_cache} \leq d_{setup}$, given that an appropriate β is used.

To summarize, every established SVC is kept alive (i.e., cached) for a duration of $t_{cache}$ that is determined by equation (1). Moreover, $t_{cache}$ is adapted to the changes of mean call arrival rate λ, and mean call setup latency $d_{setup}$ in the ATM network by measuring both variables. Every end office's T-IWF carries out these procedures for every other terminating end office. When a new call request arrives and if there is already a cached SVC for the destination end office, the same SVC is utilized for this new call without the need to perform another SVC setup procedure. According to a preferred embodiment, when more than one cached SVC is available for the same destination, the oldest cached SVC is selected.

Every SVC needs a unique identification because the T-IWFs must distinguish which SVCs are cached in order to use the cached SVC. Thus, the originating T-IWF notifies the terminating T-IWF of the identification of the cached SVC. The protocol to notify is preferably Media Gateway Control Protocol (MGCP). Other protocols accomplishing the same result may of course be substituted for MGCP.

Figure 4:
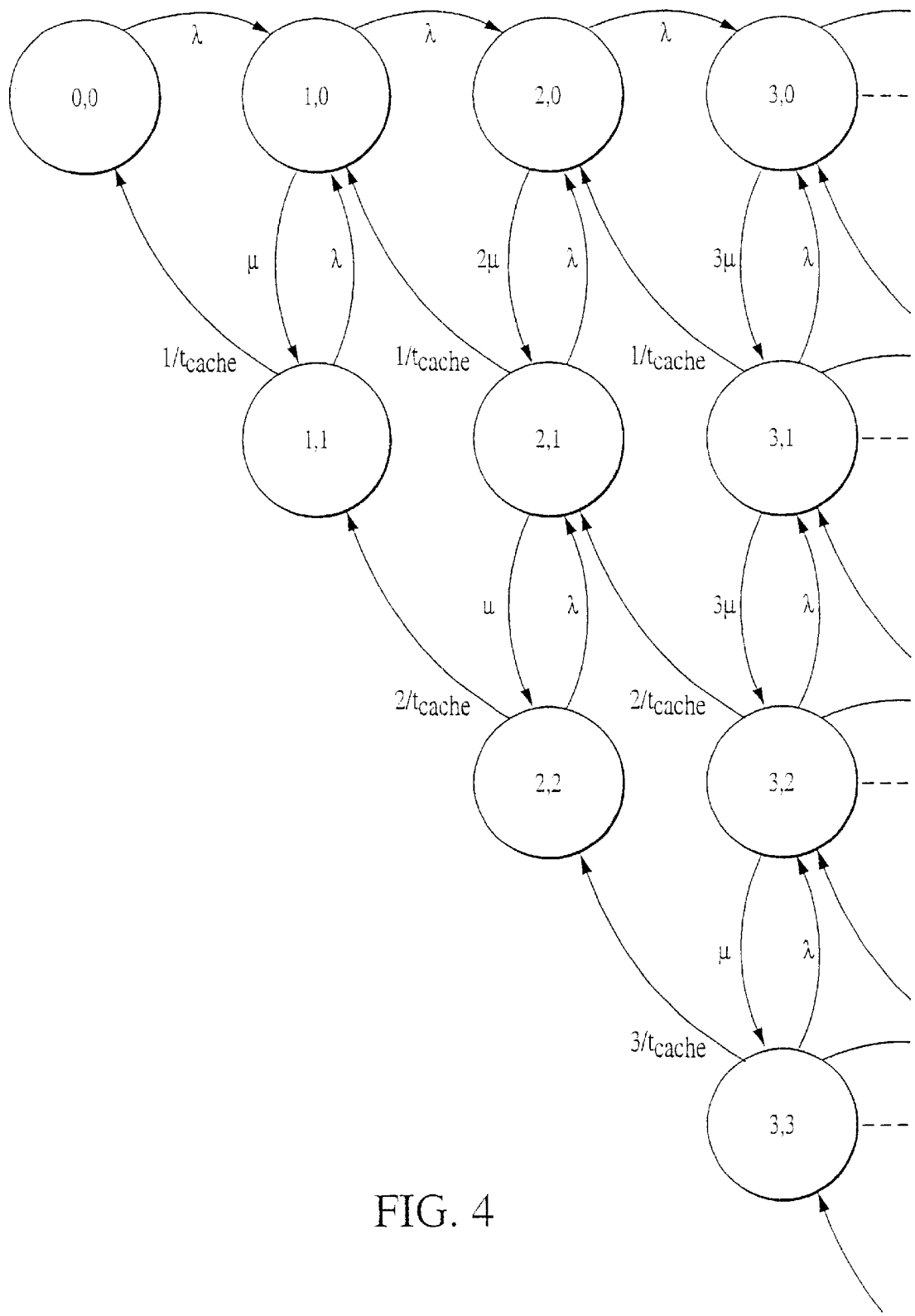
FIG. 4 shows a Markov Chain, according to an aspect of the present invention.

The derivation of equations (1) and (2) is now explained. An explicit relation between the mean SVC setup latency and the caching time is first determined. In the analysis, calls are assumed to have a Poisson arrival rate λ, and Exponentially distributed independent holding times with a mean 1/μ. A Markov Chain shown in FIG. 4 shows the state represented by pairs (number of SVCs, number of cached SVCs), where the number of SVCs include all established connections, and the number of cached SVCs represents SVCs that are in the cache and not currently carrying any traffic. The upper limit for the number of SVCs is the total number of trunks (DS0s), represented by $N_{trunk}$, originating from the end office switch. Only a portion of the total trunks is allowed to be cached due to trunk efficiency concerns as well as due to SVC needs of other services. Therefore, an upper limit exists, represented by $N_{cache\_limit}$ for the number of cached SVCs. The discussion of how to select an appropriate $N_{cache\_limit}$ is provided below.

The cached SVCs, if they are not recycled, are released after the caching duration $t_{cache}$ expires. Although $t_{cache}$ is constant for every adaptation period, in this analysis it is assumed to be Exponentially distributed.

The steady state distribution of the Markov Chain can be found numerically by the Gauss-Seidel method given on pages 128–130 in W. J. Stewart, *Introduction to the Numerical Solution of Markov Chains*, Princeton, N.J., Princeton University Press, 1994, the disclosure of which is expressly incorporated herein by reference in its entirety. Consequently, it is straightforward to find the mean call setup latency of the adaptive caching $d_{post\_cache}$ as shown in equation (3) below. It is noted that when there is a cached SVC in the system, the setup latency of a new call is zero because it is assumed that the SVC setup latency for a call handled by a cached SVC is zero. Hence, only the states with no cached SVCs (i.e., π(I, 0)) contribute to the calculation.

$$d_{post\_cache} = \sum_{i=0}^{N_{trunk}} \pi(i, 0)d_{setup} \quad (3)$$

Because the construction of the state transition matrix of the Markov Chain is cumbersome, an approximation is developed. For this approach, the calls are first served by a M/MC/∞ queuing system, In the caching system, SVCs are served (i,e., released) by an Exponential server with a mean period of $t_{cache\_mean}=f(t_{cache}, \lambda, \mu)$, where $t_{cache\_mean} \in [0, t_{cache}]$ due to cache hits. Because it is hard to calculate an exact expression for $t_{cache\_mean}$ the following heuristic approximation suffices: $t_{cache\_mean} \approx \beta * t_{cache}$, $\beta \in [0, 1]$. Again, once the steady state distribution is determined, which is Poisson in this case, as seen in equation (4), the mean cell setup latency is determined as shown in equation (5).

The infinite size of the queuing system in this approximation is a reasonable assumption because in practice, the number of trunks is designed to be extremely large in order to have a very small blocking probability ($\approx 10^{-3}$). Although a certain percentage ($\approx 10\%$) of the total trunks is allowed for caching in practice due to efficiency concerns, the number of cacheable SVCs is still large, considering the total number of trunks in end offices today is greater than 4000.

$$\pi(i) \approx (\lambda \beta t_{cache})^i \frac{\exp(-\lambda \beta t_{cache})}{i!}, i = 0, 1, \ldots \quad (4)$$

$$d_{post\_cache} \approx \pi(0) d_{setup} = d_{setup} \exp(-\lambda \beta t_{cache}) \quad (5)$$

The approximation given in equation (5) furnishes a very useful relation among caching time $t_{cache}$, call arrival rate $\lambda$, and allocated delay budget $d_{budget}$ show in equation (6).

$$t_{cache} \approx \frac{1}{\lambda \beta} \log\left(\frac{d_{setup}}{d_{budget}}\right) \quad (6)$$

Figure 5:
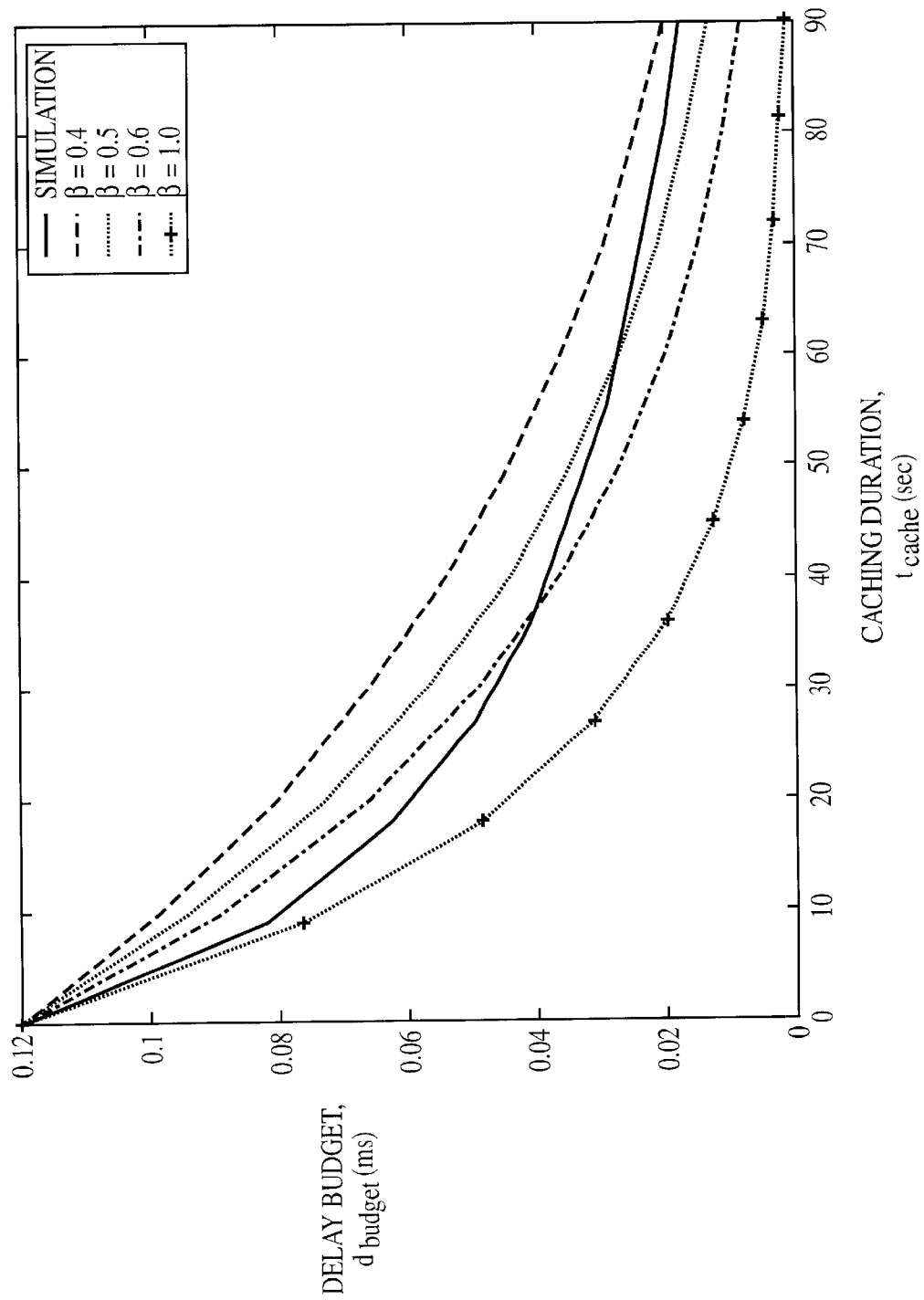
FIG. 5 shows the closeness of the approximation to the simulation result, according to an aspect of the present invention.

In FIG. 5, the closeness of the approximation to the simulation result is shown for various $\beta$ values. For this example, $\lambda=0.1$ calls/second, $1/\mu=90$ seconds and $d_{setup}=120$ ms. As seen in FIG. 5, the closer $\beta$ is to 1, the more aggressive the approximation is. Also, the closer $\beta$ is to 0, the more conservative the approximation is. One important point is that an inverse relation exists between delay budget $d_{budget}$ and caching time $t_{cache}$.

Two steps are required to calculate $N_{cache\_limit}$. First, an optimum cache duration $t^*_{cache}$ is needed from equation (6). "Optimum" means the unique $t_{cache}$ value calculated from equation (6) for a given SVC setup latency requirement $d_{budget}$. The assumption here is that there is a reasonably accurate estimation of the call arrival rate $\lambda$. At this step, the SVC setup latency $d_{setup}$ in the ATM network is judged. The estimation of $d_{setup}$ depends on many factor such as the overall call arrival rate to the network (and its distribution therein), the network topology, and the expected number of ATM switches to be involved in the call. The ATM switches have different latency figures for different call arrival rates to which they are exposed. For instance, an ATM switch could have a 10 ms SVC setup latency for 50 calls/second and 30 ms for 100 calls/second. In practice, the ATM network is designed in such a way that the call arrival rate to a single ATM switch is kept below a required value. In addition, a constraint of a maximum number of ATM switches for a call to traverse can be imposed in topology design. In light of these observations, there are many engineering considerations influencing the first step.

In the second step, the probability $\pi(N_{cache\_limit})$ to run out of cacheable SVCs (i.e., to hit the upper limit of the number of cached SVCs) is to be decided. Once again, $\pi(N_{cache\_limit})$ is an engineering parameter to be tuned. That is, it is up to the network operator to decide on how frequently the cache limit $N_{cache\_limit}$ could be hit. After $\pi(N_{cache\_limit})$ is given, $N_{cache\_limit}$ can be found from the well known Erlang-B formula. Note that $\lambda$ and $t^*_{cache}$ are known from the first step.

The following discussion focuses on the measurement-based adaptive caching of the present invention applied in a simulated voice network of a large metropolitan area. It is demonstrated that the method adapts to current changes, that the setup latency is actually less than the required delay, and that the algorithm adapts to sudden changes in the network. Finally, it is shown that the process operates efficiently, i.e., without wasting excessive network resources.

In the following simulations, a single end office is examined, and the call blocking probability in the ATM network is assumed to be zero. This assumption seems unreasonable at first. It is realistic, however, especially when the telecommunications carrier designs its ATM network to have virtually zero-blocking capacity for VTOA applications.

The ATM network is a black box represented by an SVC setup latency distribution in the simulations. This simplification avoids the simulation of every node in the network, as well as the PNNI routing protocol. In addition, the cross-traffic for every other destination source pair should be simulated. As a result, the complexity could be extremely large, especially when simulating large metropolitan area networks with many end offices and a relatively large number of ATM switches in the broadband backbone. For this reason, the SVC setup latency experienced in the ATM network is characterized by different distributions representing different load conditions. In the following simulations, Gaussian and Weibull distributions will represent the network latency.

In the simulations, it is assumed that there are $N_{EO}$ end offices, and the aggregate call arrival rate to the end office of interest is uniformly distributed among the destination end offices. The uniform distribution is chosen to test the worst case performance of the adaptive caching. If, in fact, call requests focus on certain destinations (e.g., community of interest), the SVC caching scheme will perform better, that is, there will be more cache hits overall.

To measure the efficiency of the caching algorithm, a new performance metric $\rho$ is defined in equation (7). As seen from its definition, $\rho$ is the ratio of the average duration of SVC utilized (carried voice traffic) to the total duration of SVCs utilized or cached (kept alive after the conversation is over). In equation (7), $m_{busy,i}$ represents the number of utilized (cached) SVCs for the if end office, and $m_{idle,i}$ represents the number of cached SVCs for the $i^{th}$ end office. For instance, if an SVC carries traffic for an 80 second duration and then is cached idle for 20 seconds, the efficiency of this SVC is 80%. Obviously, the ideal condition is when $\rho=1$. The closer $\rho$ is to 1, the more successful the caching scheme is. In other words, $\rho$ is the measure of success of the caching scheme.

$$p(t) = \frac{\sum_{i=0}^{N_{EO}} \int_0^t m_{busy,i}(\tau) d\tau}{\sum_{i=0}^{N_{EO}} \left(\int_0^t m_{busy,i}(\tau) d\tau + \int_0^t m_{idle,i}(\tau) d\tau\right)} \quad (7)$$

To illustrate the viability of the caching scheme of the present invention, extensive simulations have been performed by the present inventors. By experimental study, the following questions are answered: "Does the adaptive caching provide the ultimate goal of keeping the call setup latency below the required value?"; "Does the adaptive caching adapt to the changes in $d_{setup}$ and $\lambda$?"; and "How efficient is the adaptive caching?".

Figure 6A:
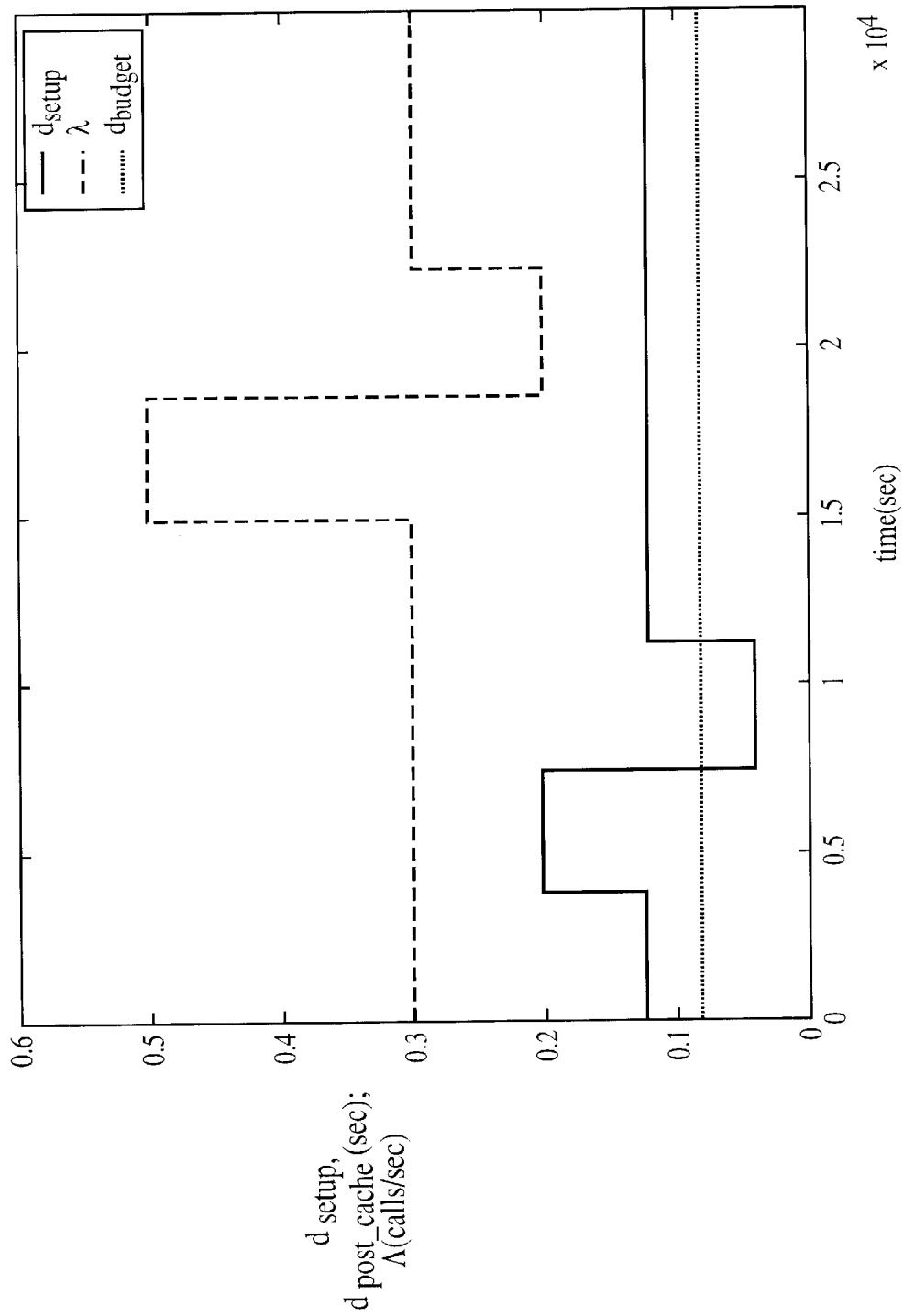
FIGS. 6a–6d illustrate a first simulation employing a Gaussian distributed SVC latency, according to an aspect of the present invention.

In FIGS. 6a–6d, the results of a first simulation scenario are shown. The tuning parameters of the caching scheme and the system parameters are as follows: $\beta=0.5$, $w=0.1$, $d_{budget}=$ 80 ms, $N_{EO}$=50, $N_{trunk}$=4000, $N_{cache\_limit}$=400, and $1/\mu$=90 seconds. The measurement interval $T_{MI}$ is set as 30 seconds. The measurement interval $T_{MI}$ is determined so that there are a sufficient number of measurement samples to reasonably estimate $d_{setup}$ and $\lambda$. A Gaussian on $N(d_{setup}, d_o)$ is employed for the SVC setup latency in the ATM network, as is a Poisson call arrival rate $\lambda$. To address the second question posed above, $N(d_{setup}, d_o)$ and $\lambda$ are changed over time, as depicted in FIG. 6a. When $\lambda$=0.3 calls/second (per each terminating end office), the evolution of $N(d_{setup}, d_o)$ is as follows: N(120 ms→5 ms)→N(200 ms, 5 ms)→N(40 ms, 5 ms)→N(120 ms, 5 ms). In the second part of the simulation, the SVC setup latency distribution is kept as N(120 ms, 5 ms), while the call arrival rate $\lambda$ is changed from 0.3 calls/second to 0.5 calls/second, then from 0.5 calls/second to 0.2 calls/second, and finally from 0.2 calls/second back to 0.3 calls/second.

Figure 6B:
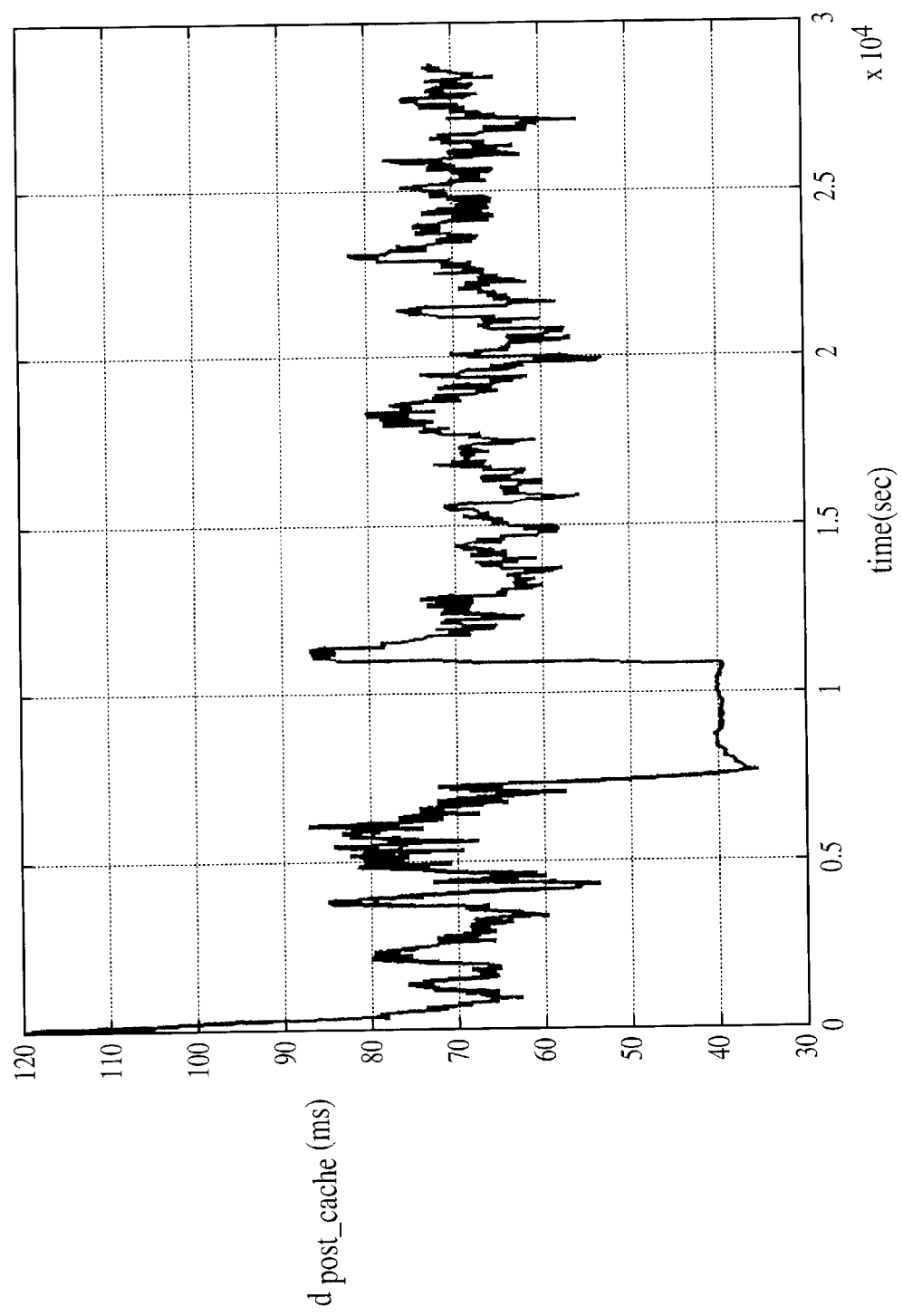
Figure 6C:
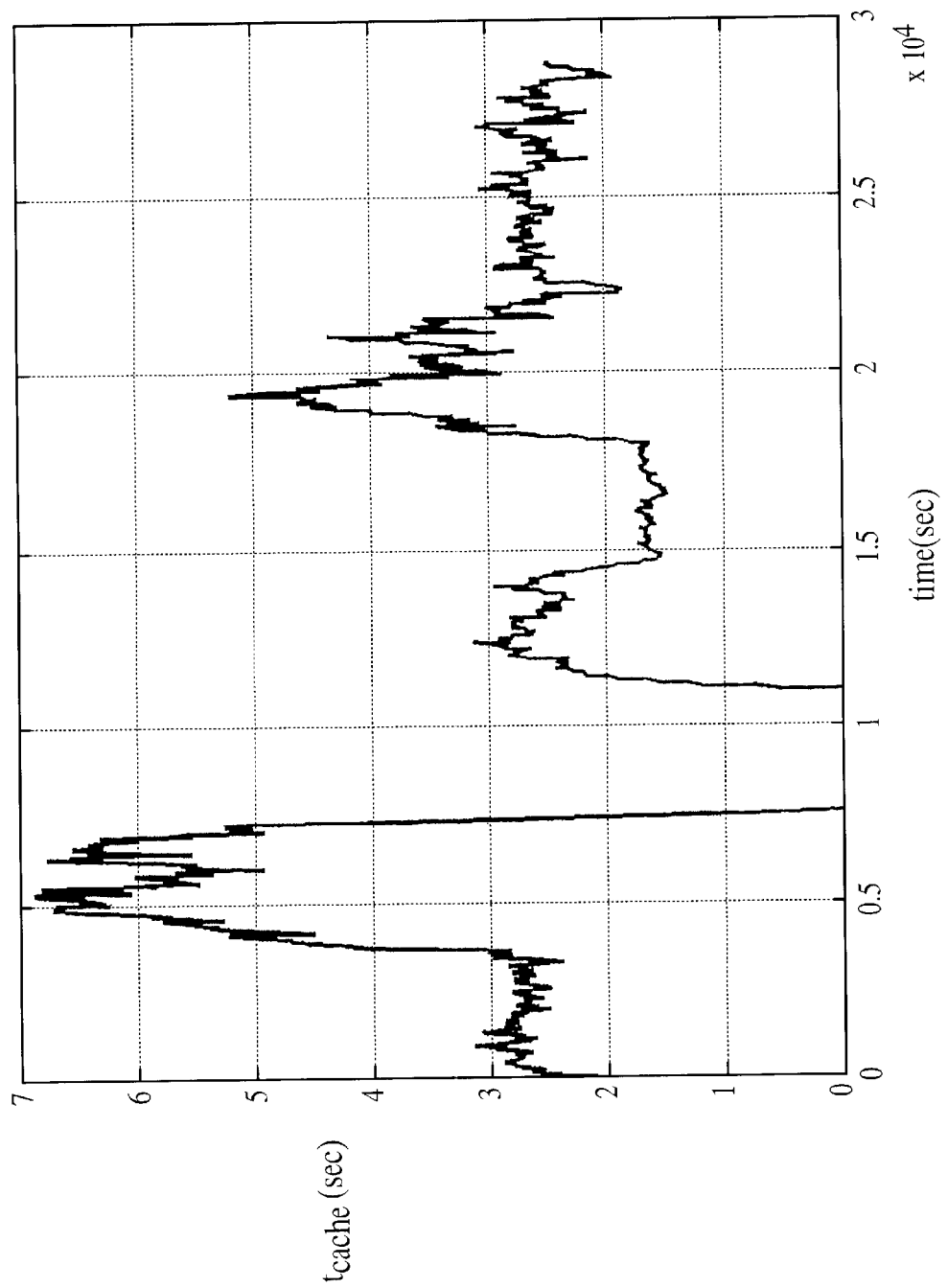

As illustrated in FIG. 6b, the caching of the present invention keeps the call setup latency $d_{post\_cache}$ below the requirement $d_{budget}$=80 ms. During sudden changes in $d_{setup}$ or in $\lambda$, temporary violations occur. The violations can be overcome by using a $\beta$ smaller than 0.5. In FIG. 6c, the evolution of $t_{cache}$ is shown. Whenever the difference of $d_{setup}$-$d_{budget}$ increases or $\lambda$ decreases, $t_{cache}$ increases. As $d_{setup}$-$d_{budget}$ increases, the algorithm increases $t_{cache}$ to improve the cache hits. Thus, the number of normal SVC setups through the ATM network is reduced. As a result, the mean call setup latency $d_{post\_cache}$ is kept below $d_{budget}$. When $\lambda$ decreases, $t_{cache}$ has to be increased as well to keep the cache hits constant, as cache hits decline due to fewer incoming calls if $t_{cache}$ is not modified. The other noticeable observation is that $t_{cache}$=0 when $d_{setup}$<$d_{budget}$. Obviously, when the SVC setup latency in the ATM network is smaller than the requirement, caching is not necessary.

Figure 6D:
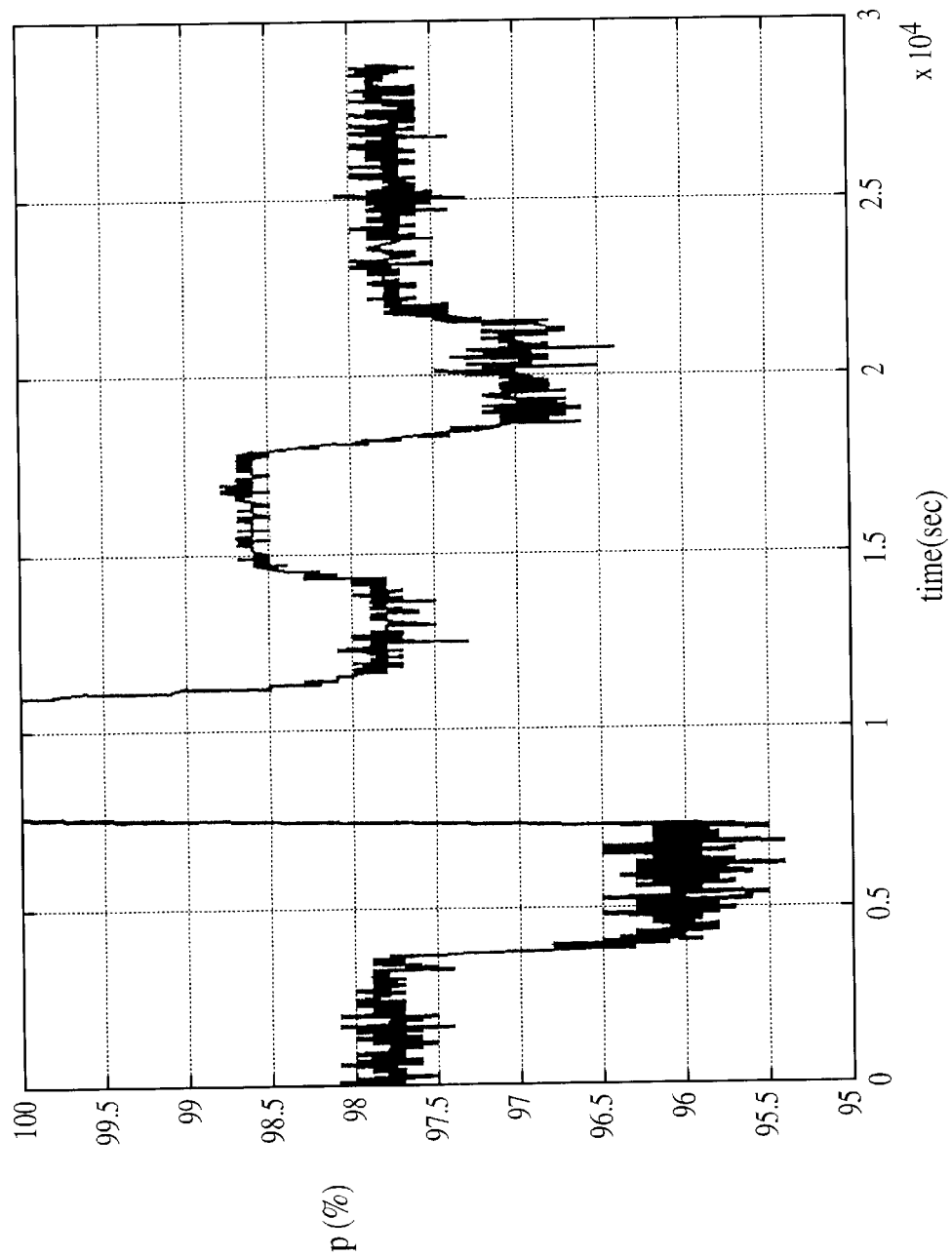

The caching of the present invention is quite efficient (e.g., greater than 96%), as shown in FIG. 6d. From the evolution of $t_{cache}$ and $\rho$, it is noted that whenever $t_{cache}$ increases $\rho$ decreases and vice versa. The reason is that an increase in $t_{cache}$ means there is an escalation in idle SVC duration on the average.

The adaptive caching of the present invention constantly probes SVC setup latency $d_{setup}$ in the ATM network, as well as the call arrival rate $\lambda$. Therefore, measurement errors may dampen the effectiveness of the algorithm. To test the effect of measurement errors on the performance of the adaptive caching, the standard deviation of the Gaussian distribution for the SVC setup latency is increased. While $d_o$=5 ms in the previous scenario, $d_o$=50 ms (a ten fold increase) in the second scenario. The other parameters are the same as in the first simulation scenario. As the simulation results show in FIGS. 7a–7d, the adaptive caching of the present invention is quite robust, and increased variance has almost no effect on the performance. At this point, it is noted that the size of the measurement interval $T_{MI}$ has a great impact on the estimation of $d_{setup}$ and $\lambda$. If $T_{MI}$ is kept unreasonably small, there will be an insufficient number of samples to adequately estimate a mean.

Figure 7A:
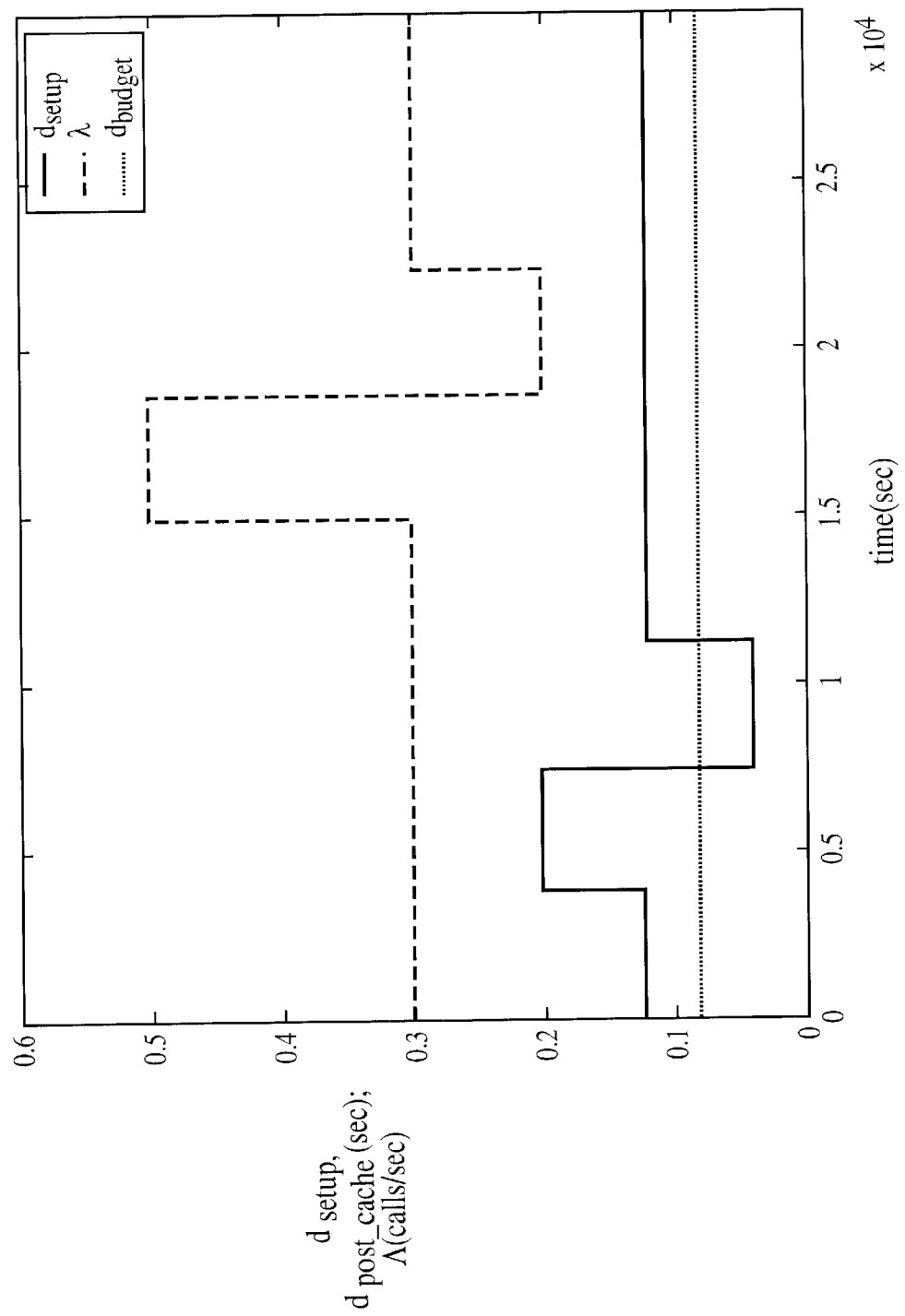
FIGS. 7a–7d illustrate a second simulation employing a Gaussian distributed SVC latency, according to an aspect of the present invention.
Figure 7B:
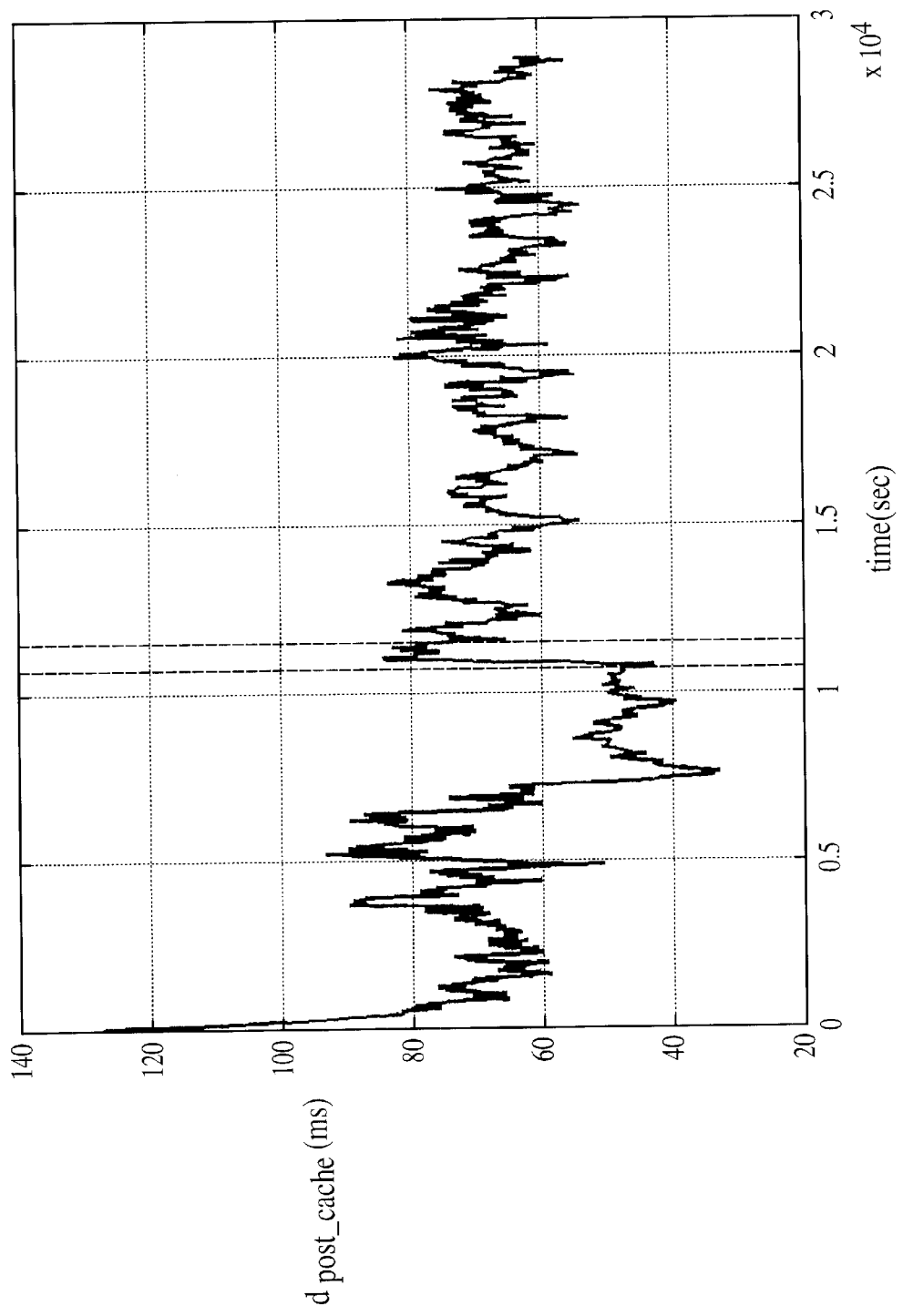
Figure 7C:
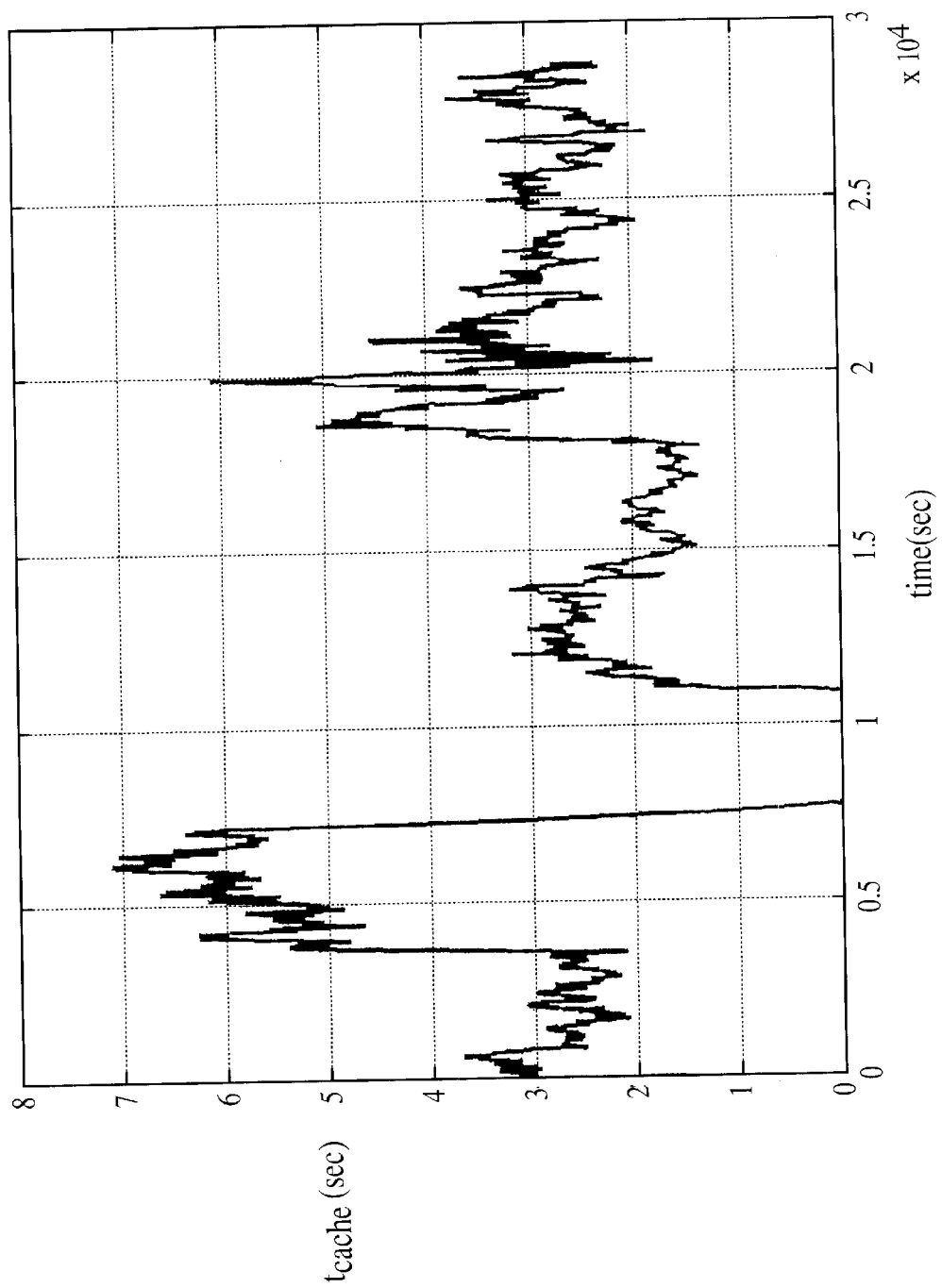
Figure 7D:
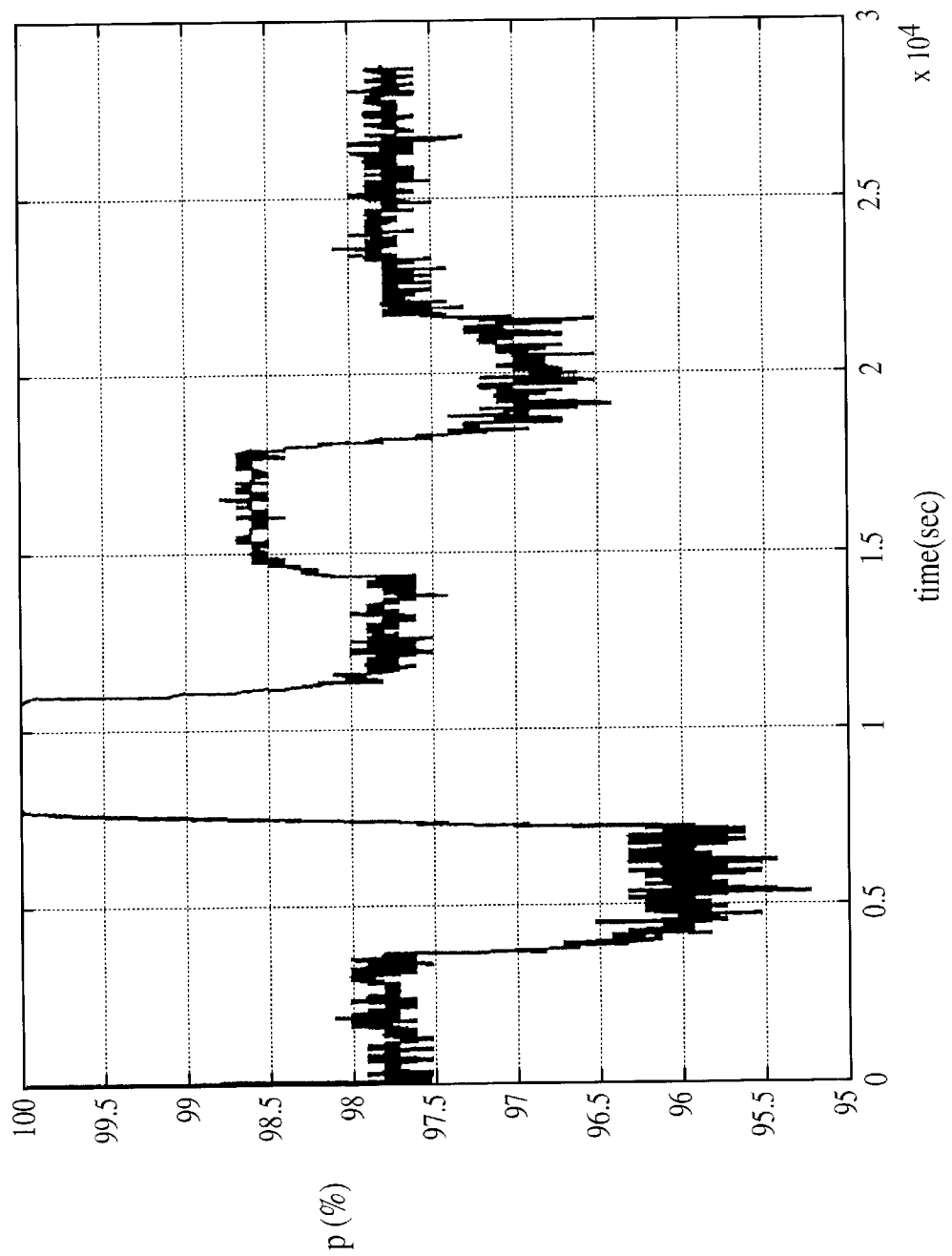
Figure 8:
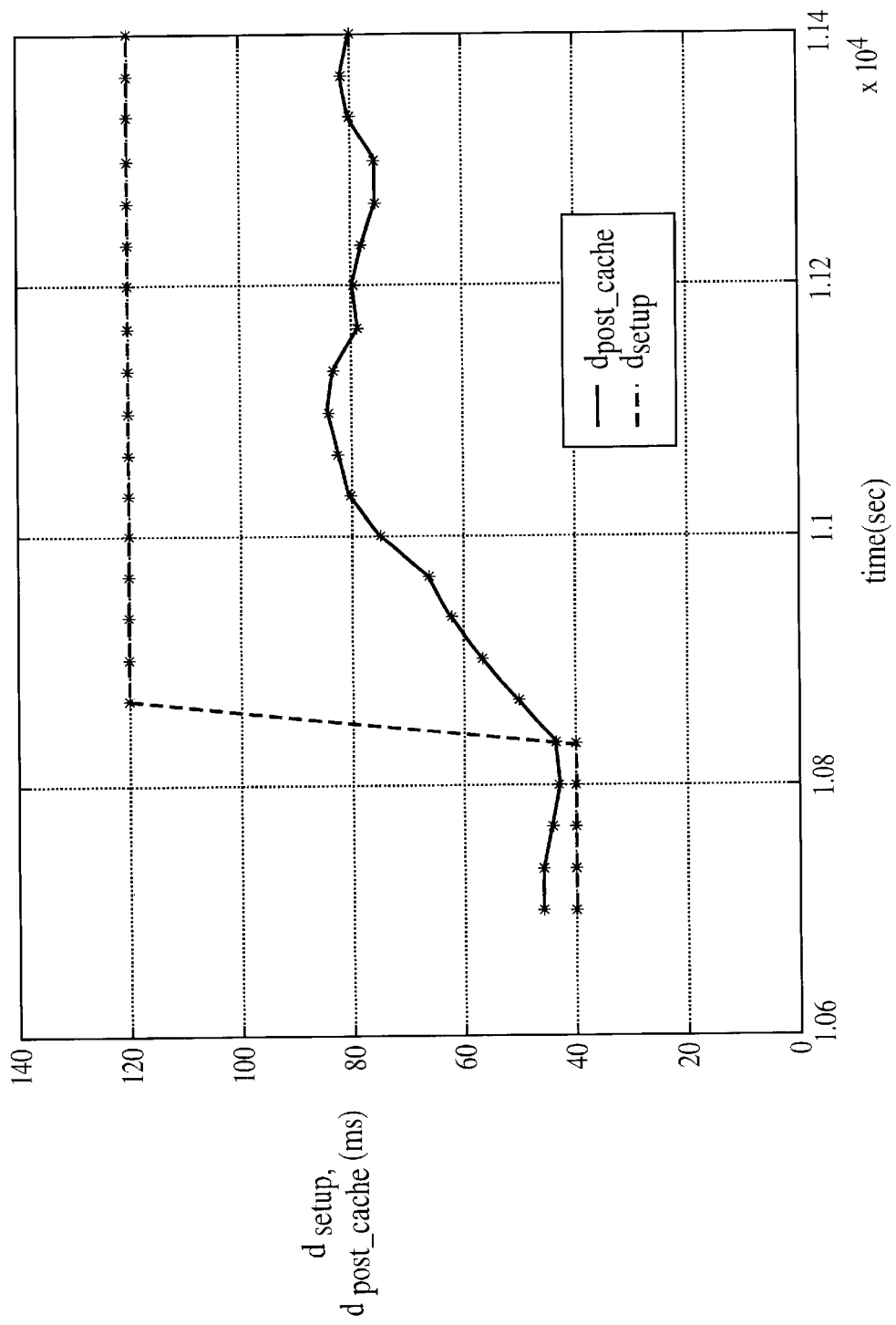
FIG. 8 illustrates the converging rate of the caching, according to an aspect of the present invention.

The convergence time of the adaptive caching is an important consideration. To show how fast the adaptation of the algorithm is, the area between two vertical dashed lines in FIG. 7b is enlarged and is shown in FIG. 8. In FIG. 8, every point represents a measurement interval ($T_{MI}$), which corresponds to 30 seconds. As depicted in the figure, upon sudden change in $d_{setup}$ (from 40 ms to 120 ms), $d_{post\_cache}$ reaches the requirement ($d_{budget}$=80 ms) in 6 steps, i.e., 180 seconds. It is important to note that the convergence rate of the algorithm depends on many factors; the weight w used in the filters, and the measurement interval $T_{MI}$ are the first factors to consider. Obviously, w could be increased or a shorter duration for $T_{MI}$ could be used to increase the convergence rate. However, it should be noted that, the former leads to instability (e.g., oscillation) due to increased sensitivity to transient changes, whereas the latter has the same effect because of insufficient statistics collection.

Figure 9A:
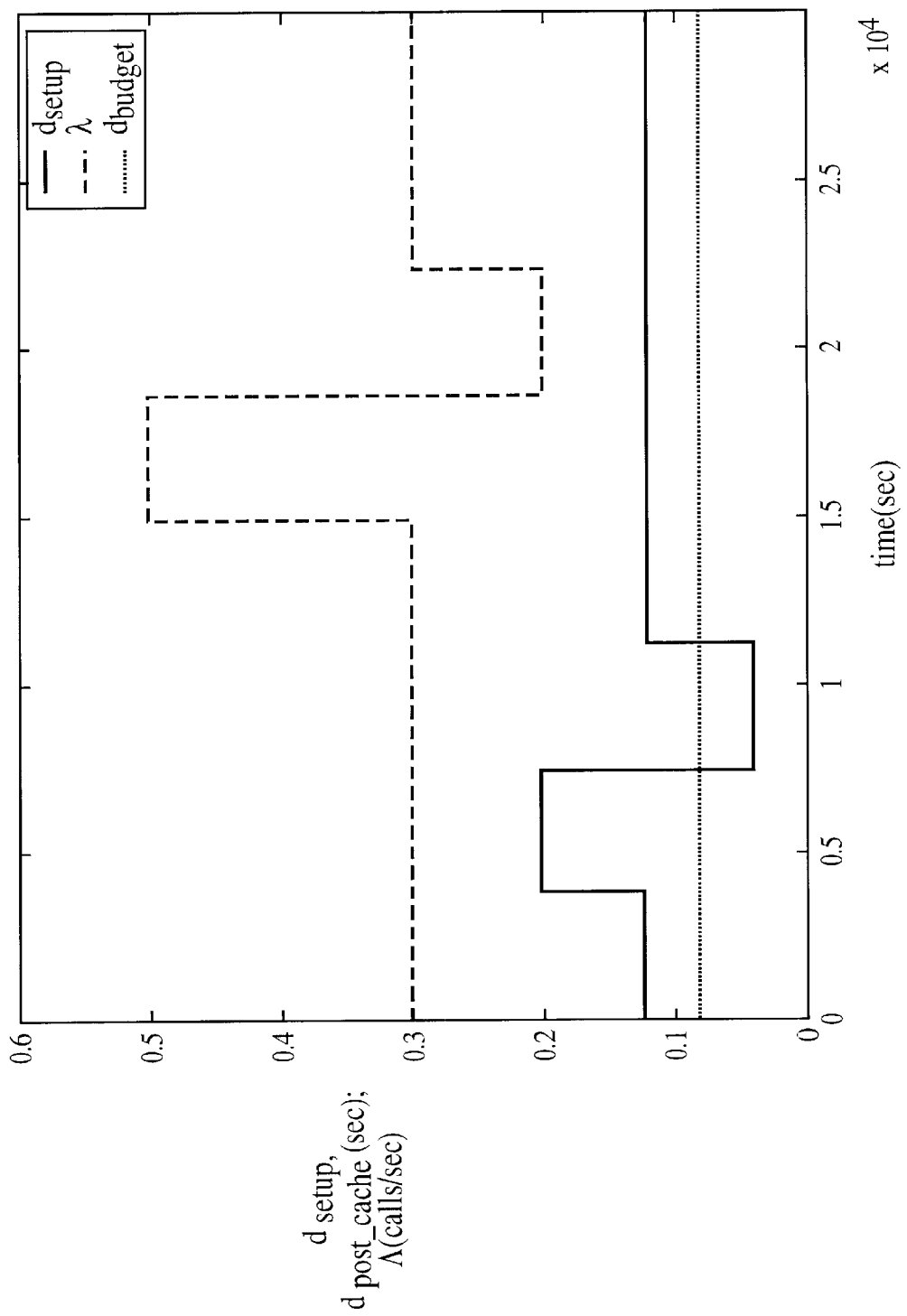
FIGS. 9a and 9b illustrate a third simulation employing a Weibull distributed SVC latency, according to an aspect of the present invention.
Figure 9B:
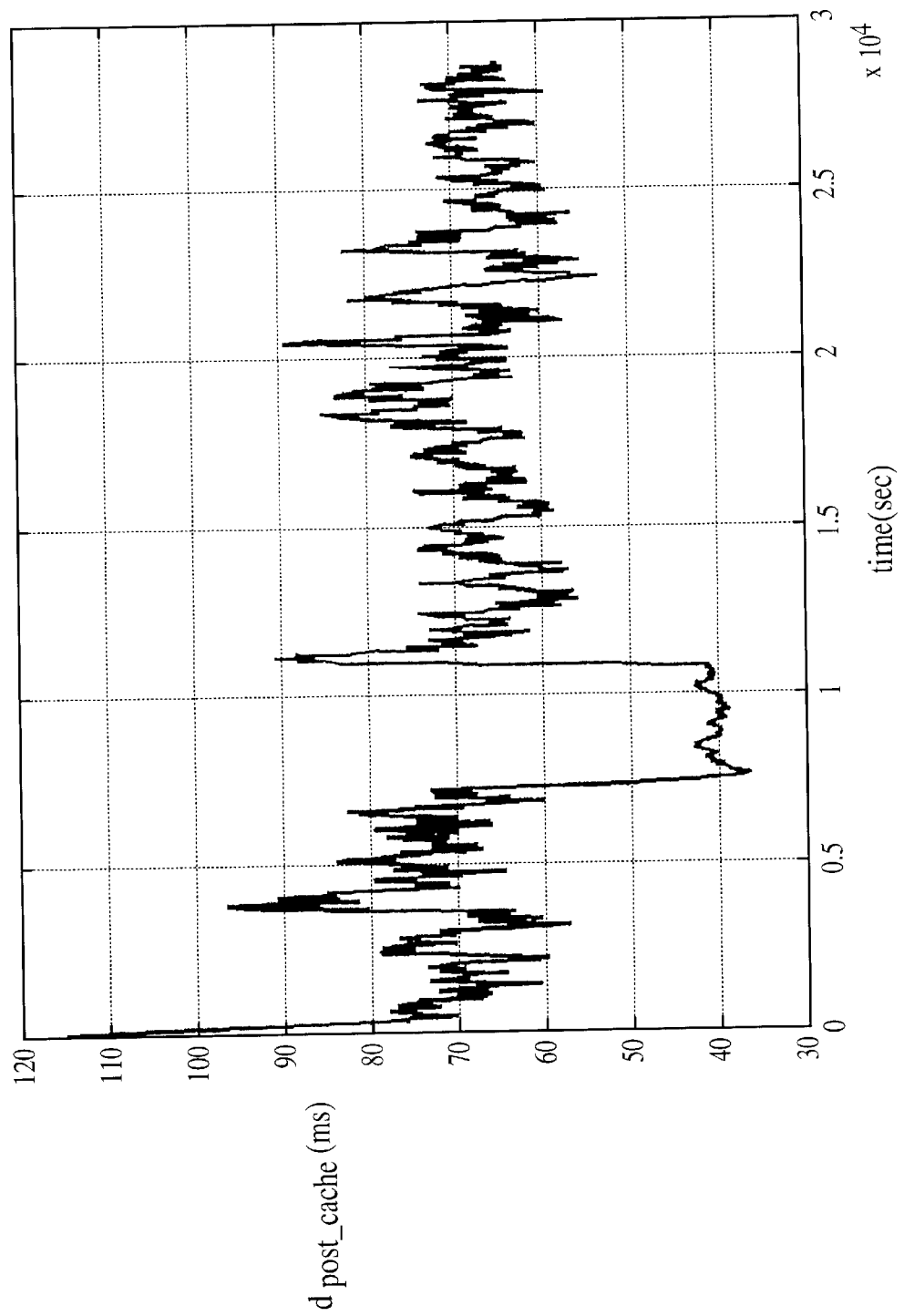

In the previous simulations, a Gaussian distribution was employed for SVC setup latency in the ATM network. Next, the effect of a Weibull distribution on the simulation is observed. In this scenario, $\beta$=0.5, w=0.1, $d_{budget}$=80 ms, $N_{EO}$=50, $T_{MI}$=30 seconds, $N_{trunk}$=4000, $N_{cache\_limit}$=400, and $1/\mu$=90 seconds. The mean and standard deviation ($d_{setup}$, $d_o$) of the Weibull distribution and $\lambda$ change over time, as depicted in FIG. 9a. When $\lambda$=0.3 calls/second (per each terminating end office), the evolution of ($d_{setup}$, $d_o$) is as follows: (120 ms, 43.6 ms)→(200 ms, 72.7 ms)→(40 ms, 14.5 ms)→(120 ms, 43.6 ms). In the second part of the simulation, $d_{setup}$=120 ms and $d_o$=43.6 ms, while the call arrival rate $\lambda$ is changed from 0.3 calls/second to 0.5 calls/second, then from 0.5 calls/second to 0.2 calls/second, and finally from 0.2 calls/second back to 0.3 calls/second. As seen in FIG. 9b, performance of the adaptive caching is consistent with the previous observations of the Gaussian case. The adaptive caching is based on mean estimation and does not depend on distribution. The important condition here is to select an appropriate measurement interval $T_{MI}$.

The simulation results show that there is a tradeoff between efficiency $\rho$ of the caching and SVC setup latency $d_{setup}$ of the ATM network with respect to the delay budget $d_{budget}$ allocated. That is, $d_{setup}$-$d_{budget}$ is the important factor to determine the efficiency $\rho$ of the caching. The bigger $d_{setup}$-$d_{budget}$ is, the less efficient the adaptive caching is. Intuitively, the caching duration is increased (hence, the number of cached connections) in order to meet the small delay requirement. As discussed above, the delay budget depends on the processing capacity of the ATM switches. Thus, the efficiency also depends on the call processing performance of the ATM switches.

The following example illustrates this point. In the example, there are three types of ATM switches, each having a different SVC setup latency. Consequently, the ATM network consisting of these switches will have a different SVC setup latency. The assumption is that the SVC setup processing delay in the ATM network with the first type of switch is 80 ms (mean), with the second type of switch is 120 ms, whereas with the third type of switch is 200 ms. That is, the first ATM switch has a good SVC setup performance, and the third one has a poor call processing performance. In the simulations, the total call arrival rate is 100 calls/second, and the calls are distributed uniformly to 100 destination end offices. The efficiency for each $d_{budget}\in$[5 ms, 200 ms] is obtained.

Figure 10:
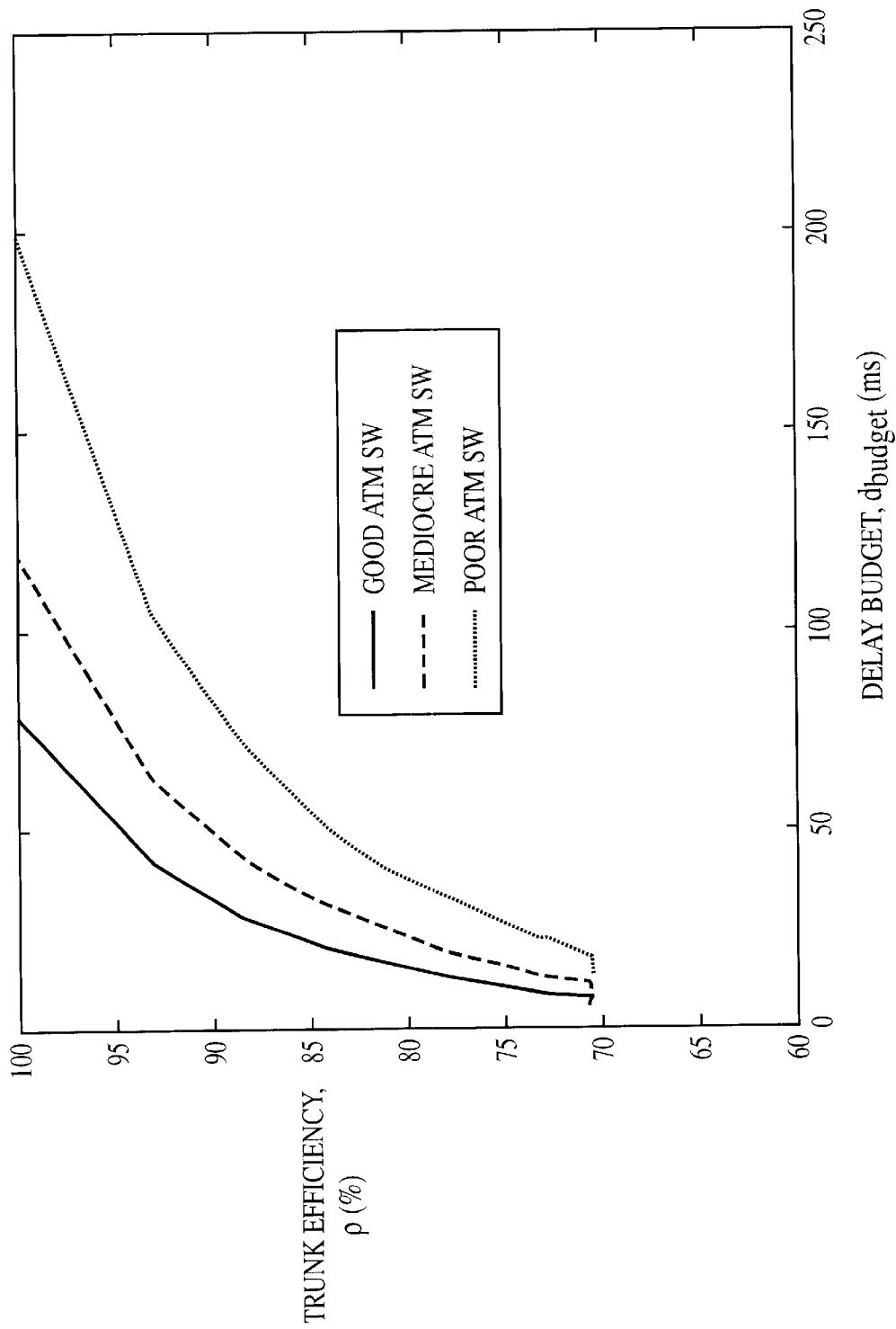
FIG. 10 illustrates the efficiency in relation to the delay budget.

The results, shown in FIG. 10, can be interpreted in two ways. First, for a given delay budget, the maximum attainable efficiency can be found for each type of ATM switch. Second, for a required efficiency, the delay budget that should be allocated can be determined. For instance, when the delay budget is 50 ms, the efficiency of the caching scheme with good, mediocre, and poor ATM switches in the backbone is 94%, 90%, and 84% respectively. On the other hand, for the target efficiency of 95%, the delay budget allocations for good, mediocre, and poor ATM switches should be 55 ms, 80 ms, and 135 ms, respectively.

The efficiency stabilizes beyond a certain delay budget value. For instance, the efficiency for the poor ATM switches remains almost constant when the delay budget is less than 20 ms. Actually, for a fixed call arrival rate, there will always be cache hits beyond a delay budget value, no matter how small it becomes, because the bigger $d_{setup} - d_{budget}$ becomes, the larger $t_{cache}$ becomes to satisfy the $d_{budget}$ requirement. For very small $d_{budget}$ values ($d_{setup}$ is fixed), $t_{cache}$ becomes so large that the efficiency ρ becomes insensitive to $d_{budget}$ due to sustained cache hits.

Although the present invention has been described with reference to varying the caching duration $t_{cache}$, the number of pre-established SVCs $n_{cache}$ can be varied instead. In this alternate embodiment, i.e., a vertical cache, depending upon the estimate of the call arrival rate, the adaptive number of pre-established SVCs $n_{cache}$ are ready for use. Hence, $n_{cache}$ could also be adaptively adjusted with the changing call requests, as time proceeds. The alternate embodiment provides similar results to the first described embodiment, as adaptation of $t_{cache}$ and $n_{cache}$ have the same effect on SVC setup latency. Consequently, as $n_{cache}$ increases, mean SVC setup latency decreases.

The drawback of the vertical cache is the lack of decomposability. The vertical scheme can be analyzed by constructing a Markov Chain (with the assumption of Poisson arrivals and Exponential holding times), where the state is represented by (number of connections, number of pre-established connections) tuples. Because the Markov Chain is not decomposable, the only way to adjust $n_{cache}$ with the changing traffic conditions is to perform numerical analysis on the newly constructed Markov Chain as λ(call arrive rate) estimations change over time. By doing so, an appropriate $n_{cache}$ can be found according to the call arrival rate measurements. Therefore, it is difficult, to find a simple explicit inverse relation between the number of pre-established SVCs $n_{cache}$ and the SVC setup latency experienced in the network. Additionally, this approach bears a high processing burden for practical realizations. As a result, it is preferable to adaptively adjust the caching duration.

The explicit inverse relation between call setup latency and caching time, shown in equation (6) helped derive a mechanism to adapt the caching time (equation (5)) which tracks the traffic (call arrival rate) and network (call processing load of the network) conditions. In the absence of this explicit relation, other adaptive schemes could be used. For instance, the Least-Mean-Square algorithm is a good candidate.

An object of the present invention is to meet the mean cross-office delay requirements set for the TDM voice networks. However, the 95$^{th}$ and 5$^{th}$ percentile values (assuming Gaussian distributions) are also described in the standards. For instance, the 5$^{th}$ percentile value shows that there will be 5% call clipping (impatient hang-ups), in which case network resources are wasted. These requirements can also be incorporated into the caching of the present invention. One approach is to take the most stringent requirement (i.e., 5th percentile) into consideration instead of the mean. In that case, all requirements would be met. Clearly, an appropriate measurement interval should be selected in order to have a sufficient number of delay samples in order to validate the Gaussian distribution assumption for the cross-office delay. The tradeoff here is the efficiency. The target requirement can be changed (mean, or 5$_{th}$ percentile, or 95$_{th}$ percentile) as the real clipping measurements become available. Thus, the requirement can also be an engineering parameter to be tuned.

According to the present invention, an adaptive SVC caching scheme is defined, preferably for VTOA applications. The motivation is based on the observation that SVC establishment through an ATM network might take longer than required by the standards of today's voice networks.

Call processing capacity in the ATM network is treated as a scarce resource. Thus, the present invention recycles already established SVCs more than once. To do so, a delayed release of an SVC mechanism is used. According to the present invention, an SVC is not torn down after the users stop the conversation (hang up), instead the SVC is kept alive for an adaptive duration (caching time), hoping that there will be another call request to the same destination. Thus, call processing for a new SVC establishment is eliminated.

An inverse relation has been found between caching time and mean call setup latency. By exploiting this dependence, an adaptation scheme for the caching time has been developed. According to the present invention, the mean call arrival rate as well as the mean call setup latency in the ATM network is measured constantly to determine the appropriate caching duration in order to meet the requirement of the mean call setup latency.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A adaptive switched virtual circuit (SVC) caching method for use within a telecommunications network, the method comprising:

defining a delay budget;

estimating a call arrival rate in the network;

estimating a call setup delay in the network; and determining a cache duration based upon the delay budget, the estimated call arrival rate, and the estimated call setup delay, wherein when an SVC is cached for the cache duration, the caching facilitates processing telephone calls in the network within the delay budget by eliminating call processing for new SVC establishment when a new call request to the destination occurs during the cache.

2. The method of claim 1, in which the cache duration is inversely related to the call setup delay.

3. The method of claim 1, in which the cache duration $t_{cache}$ is calculated from the equation:

$$t_{cache}(n) \approx \frac{1}{\beta\langle\lambda\rangle(n-1)} \log\left(\frac{\langle d\rangle_{setup}(n-1)}{d_{budget}}\right)$$

where:

<λ> is an estimate of the mean call arrival rate,

<d>$_{setup}$ is an estimate of the mean call setup delay in an ATM network;

$d_{budget}$ is the delay budget;

β is a predetermined constant between zero and one; and n is the time when the call arrival rate and the call setup delay are measured.

4. The method of claim 1, in which the estimating the call arrival rate comprises periodically measuring the call arrival rate at a predetermined interval, and in which the estimating the call setup delay in the network comprises periodically measuring the call setup delay in the network at a predetermined interval.

5. A adaptive switched virtual circuit (SVC) caching method for use within a telecommunications network, the method comprising:

defining a delay budget;

estimating a call arrival rate in the network;

estimating a call setup delay in the network;

determining a cache duration based upon the delay budget, the estimated call arrival rate, and the estimated call setup delay;

establishing an SVC to a destination in response to a telephone call to the destination;

caching the SVC for the cache duration after the telephone call terminates;

reusing the cached SVC when a new call request to the destination occurs during the cache; and releasing the cached SVC after the cache duration when no new call request to the destination occurs during the cache, wherein the cached SVC facilitates processing telephone calls in the network within the delay budget by eliminating call processing for new SVC establishment when the new call request to the destination occurs during the cache.

6. The method of claim 5, in which the estimating the call arrival rate comprises periodically measuring the call arrival rate at a predetermined interval, and in which the estimating the call setup delay in the network comprises periodically measuring the call setup delay in the network at a predetermined interval.

7. The method of claim 5, in which the measuring the call setup delay further comprises measuring the time between transmitting an initial setup message from an originating T-IWF and receiving a final connect message at the originating T-IWF.

8. The method of claim 5, in which the cache duration is inversely related to the call setup delay.

9. The method of claim 5, in which the cache duration $t_{cache}$ is calculated from the equation:

$$t_{cache}(n) \approx \frac{1}{\beta \langle \lambda \rangle (n-1)} \log\left(\frac{\langle d \rangle_{setup}(n-1)}{d_{budget}}\right)$$

where:

$\langle \lambda \rangle$ is an estimate of the mean call arrival rate;

$\langle d \rangle_{setup}$ is an estimate of the mean call setup delay in an ATM network;

$d_{budget}$ is the delay budget;

$\beta$ is a predetermined constant between zero and one; and n is the time when the call arrival rate and the call setup delay are measured.

10. The method of claim 9, in which the estimate of the mean call arrival rate is filtered, and the estimate of the mean call setup delay in the ATM network is filtered.

11. The method of claim 10, in which the estimate of the mean call arrival rate is filtered according to the equation:

$\langle \lambda \rangle(i)=(1-w)\langle \lambda \rangle(i-1)+w\langle \lambda \rangle(i)$ and the estimate of the mean call setup delay in the ATM network is filtered according to the equation:

$\langle d \rangle_{setup}(i)=(1-W)\langle d \rangle_{setup}(i-1)+w\langle d \rangle_{setup}(i)$ where w is a weight, and i is a unit of time.

12. The method of claim 11, in which w=0.1.

13. The method of claim 5, further comprising selecting a longest cached SVC for use when more than one cached SVC is available for the destination.

14. A telecommunications system for adaptive switched virtual circuit (SVC) caching, the telecommunications system having a predefined delay budget, the system comprising:

an ATM network having a call arrival rate and a call setup delay;

at least one SVC within the network, the SVC being established to a destination in response to a telephone call to the destination;

a plurality of T-IWFs that estimate the call arrival rate and the call setup delay, each T-IWF determining a cache duration based upon the predefined delay budget, the estimated call arrival rate, and the estimated call setup delay; and a CS-IWF, wherein the SVC is cached for the cache duration after the telephone call terminates, the cached SVC being reused when a new call request to the destination occurs during the cache, the cached SVC being released after the cache duration when no new call request to the destination occurs during the cache, and wherein the cached SVC facilitates processing telephone calls in the ATM network within the delay budget by eliminating call processing for new SVC establishment when the new call request to the destination occurs during the cache.

15. The system of claim 14, in which the cache duration is inversely related to the call delay.

16. The system of claim 14, in which each T-IWF calculates the cache duration $t_{cache}$ from the equation:

$$t_{cache}(n) \approx \frac{1}{\beta \langle \lambda \rangle (n-1)} \log\left(\frac{\langle d \rangle_{setup}(n-1)}{d_{budget}}\right)$$

where:

$\langle \lambda \rangle$ is an estimate of the mean call arrival rate.

$\langle d \rangle_{setup}$ is an estimate of the mean call setup delay in the ATM network;

$d_{budget}$ is the delay budget;

$\beta$ is a predetermined constant between zero and one; and n is the time when the call arrival rate and the call setup delay are measured.

17. The system of claim 16, in which the estimate of the mean call arrival rate is filtered, and the estimate of the mean call setup delay in the ATM network is filtered.

18. The system of claim 17, in which the estimate of the mean call arrival rate is filtered by the equation:

$\langle \lambda \rangle(i)=(1-w)\langle \lambda \rangle(i-1)+w\langle \lambda \rangle(i)$ and the estimate of the mean call setup delay in the ATM network is filtered by the equation:

$\langle d \rangle_{setup}(i)=(1-w)\langle d \rangle_{setup}(i-1)+w\langle d \rangle_{setup}(i)$ where w is a weight, and i is a unit of time.

19. The system of claim 14, in which the T-IWFs estimate the call arrival rate by periodically measuring the call arrival rate at a predetermined interval, and in which the T-IWFs estimate the call setup delay in the network by periodically measuring the call setup delay in the network at a predetermined interval.

20. The system of claim 19, in which the plurality of T-IWFs further comprise an originating T-IWF, the originating T-IWF measuring the call setup delay by measuring the time between transmitting an initial setup message from the originating T-IWF and receiving a final connect message at the originating T-IWF.

21. The system of claim 14, in which the T-IWF selects a longest cached SVC for reuse when more than one cached SVC is available for the destination.

\* \* \* \* \*

UNITED STATES PATENT AND TRADEMARK OFFICE
CERTIFICATE OF CORRECTION

PATENT NO. : 6,343,065 B1
DATED : January 29, 2002
INVENTOR(S) : Y. Serbest et al.

It is certified that error appears in the above-identified patent and that said Letters Patent is hereby corrected as shown below:

<u>Title page,</u>
Item [54], "Of" (first occurrence) should be -- For --.

Signed and Sealed this

Twenty-eighth Day of January, 2003

JAMES E. ROGAN
*Director of the United States Patent and Trademark Office*